United States Patent
Taylor

(10) Patent No.: US 7,609,979 B2
(45) Date of Patent: Oct. 27, 2009

(54) COHERENT OPTICAL DETECTION AND SIGNAL PROCESSING METHOD AND SYSTEM

(76) Inventor: Michael George Taylor, 8334 Sperry Ct., Laurel, MD (US) 20723

( * ) Notice: Subject to any disclaimer, the term of this patent is extended or adjusted under 35 U.S.C. 154(b) by 0 days.

(21) Appl. No.: 12/324,971

(22) Filed: Nov. 28, 2008

(65) Prior Publication Data

US 2009/0142077 A1 Jun. 4, 2009

Related U.S. Application Data

(62) Division of application No. 10/728,247, filed on Dec. 4, 2003, now Pat. No. 7,460,793.

(60) Provisional application No. 60/432,500, filed on Dec. 11, 2002, provisional application No. 60/445,742, filed on Feb. 7, 2003.

(51) Int. Cl.
    *H04B 10/06* (2006.01)

(52) U.S. Cl. ........................ 398/204; 398/208

(58) Field of Classification Search ............... 398/202, 398/204, 205, 206, 207, 208, 209, 210, 211
    See application file for complete search history.

(56) References Cited

U.S. PATENT DOCUMENTS

| | | | | |
|---|---|---|---|---|
| 5,060,312 A | * | 10/1991 | Delavaux | 398/204 |
| 5,115,332 A | * | 5/1992 | Naito et al. | 398/202 |
| 5,146,359 A | * | 9/1992 | Okoshi et al. | 398/202 |
| 7,110,677 B2 | * | 9/2006 | Reingand et al. | 398/98 |

\* cited by examiner

*Primary Examiner*—Christina Y Leung
(74) *Attorney, Agent, or Firm*—Michael Diaz

(57) ABSTRACT

A method and system of coherent detection of optical signals. The system utilizes a digital signal processor to recover an incoming optical signal. The system employs a local oscillator, which does not need to be phase locked to the signal. The signal may be consistently recovered, even when the polarization state varies over time. Additionally, the signal may be recovered when it comprises two channels of the same wavelength that are polarization multiplexed together. In addition, any impairment to the signal may be reversed or eliminated.

20 Claims, 5 Drawing Sheets

COHERENT OPTICAL DETECTION AND SIGNAL PROCESSING METHOD AND SYSTEM

RELATED APPLICATIONS

This application is a divisional application of a U.S. patent application (Ser. No. 10/728,247) entitled "Coherent Optical Detection and Signal Processing Method and System" filed Dec. 4, 2003 now U.S. Pat. No. 7,460,793 by Michael G. Taylor which claims the priority date of Provisional Patent Application Ser. No. 60/432,500 by Michael G. Taylor, filed Dec. 11, 2002 and Provisional Patent Application No. 60/445,742 by Michael G. Taylor, filed Feb. 7, 2003 and is hereby incorporated by reference.

BACKGROUND OF THE INVENTION

1. Field of the Invention

This invention relates to optical transmissions over a fiber optic cable. Specifically, the present invention relates to a system and method of coherent detection of optical signals by utilizing digital signal processing to recover signals.

2. Description of the Related Art

The use of optical fiber cables for the transmission of information was introduced several years ago. Recently, with the hunger by users for the rapid transmission of large amounts of information, the utility of the transmission of optical signals is particularly evident. [see "optical Communication Systems" by J. Gowar (Gowar) and "Fiber-optic Communication Systems" by G. Agrawal (Agrawal 2)]. The transmission of this information typically takes the form of binary digital signs (i.e., logical "1"s and "0"s. In addition, fiber optics is utilized to transport analog signs, such as cable television signals.

In the 1990s, optical amplifiers were deployed in telephonic and cable television networks. Typically, erbium doped fiber amplifiers (EDFAs) were employed. The amplifiers amplify the optical signals and overcome the loss of a signal transmitted over the fiber without the need to detect and retransmit the signals. In addition, the 1990s saw the introduction of wavelength division multiplexing (WDM) on a commercial level, which increased the information carrying capacity of the fiber by transmitting several different wavelengths in parallel. During WDM, different wavelengths originate and terminate at the same place, but in some cases, wavelengths are added or dropped in route to a destination.

With optical signal transmission systems, each system has a transmitter to emit light modulated with information through the fiber optics cable and a receiver, which detects the light and recovers the information. The transmission unit contains a light source, usually a single longitudinal mode semiconductor laser. Information is imposed on the light by direct modulation of the laser current, or by external modulation (by applying a voltage to a modulator component that follows the laser signal). The receiver utilizes a photodetector, which converts light into an electric current.

There are currently two ways to detect the light, direct detection and coherent detection. Existing transmission systems all use direct detection techniques for detecting the light. Although coherent detection techniques are more complex, they do offer some distinct advantages. One of the primary advantages is that it effectively provides signal gain. However, the EDFA offered the same advantage, and it was found to be a more cost-effective solution.

Current transmission systems impose information on the amplitude (or intensity/power) of the signal. The light is switched on to transmit a "1" and off to transmit a "0." In the case of direct detection techniques, the photodetector is presented with the on-off modulated light, and consequently the current flowing through it is a replica of the optical power. After amplification, the electrical signal is passed to a decision circuit, which compares it to a reference value. The decision circuit then outputs an unambiguous "1" or "0."

There are many kinds of on-off modulation formats. The simplest one is unchirped non-return-to-zero (unchirped NRZ), where the optical power and the phase of the optical wave are kept constant during the transition between a pair of consecutive "1" symbols. Other transmission formats are chirped NRZ, return-to-zero (RZ) [see "Comparison between NRZ and RZ signal formats for in-line amplifier transmission in the zero-dispersion regime" by Matsuda (Matsuda)], carrier suppressed RZ [see "100 GHZ-spaced 8×43 Gbit/s DWDM unrepeatered transmission over 163 km using duobinary-carrier-suppressed return-to-zero format" by Y. Miyamoto et al. (Miyamoto)] and phase shaped binary transmission (PSBT) [see "The phase-shaped binary transmission (PSBT): a new technique to transmit far beyond the chromatic dispersion limit" by D. Penninckx et al. (Penninckx)].

There is also another class of modulation formats where information is encoded on the phase of the optical signal, such as optical differential phase shift keying (oDPSK). A photodetector does not respond to changes in the phase of the light falling on it, so a passive component called a discriminator is used before the photodetector. The discriminator converts the changes in phase into changes in power, which the photodetector may detect.

As discussed above, the photodetector does not respond to the phase of an optical wave. If two wavelengths are input to the photodetector, for example, the photodetector does not distinguish between the two wavelengths. The WDM systems utilize passive optical filter components to separate out the different wavelength channels at the receiver terminal, so each photodetector detects only one channel. This approach places a limit on how close the channels may be spaced, primarily based upon the optical filter's ability to pass one channel and reject its neighbors.

The coherent detection techniques treat the optical wave in a manner similar to radio wave reception by inherently selecting one wavelength and responding to its amplitude and phase. FIG. 1A illustrates a simplified block diagram of a single ended basic coherent receiver 16 in an existing fiber optics system. FIG. 1B illustrates a simplified block diagram of a coherent receiver 21 using balanced detection with two photodetectors 27 and 29 in an existing fiber optics system. An incoming signal 18 is combined with light from a local oscillator (LO) 20, which has close to the same state of polarization (SOP) and the exact or very similar wavelength. When the combined signals are detected, the photocurrent contains a component at a frequency which is the difference between the signal and the local oscillator optical frequencies. This difference frequency component contains all the information (amplitude and phase) that is on the optical signal. Because the new carrier frequency is much lower, typically a few GHz instead of 200 THz, all information on the signal can be recovered using standard radio demodulation methods. Coherent receivers see only signals close in wavelength to the local oscillator. Therefore, tuning the LO wavelength provides the functionality of a built-in tunable filter.

The coherent detection process may be explained with several mathematic equations. The following description utilizes complex notation for sinusoids that are summarized in Appendix A. The electric field of the signal may be written as:

$$\mathrm{Re}[E_S(t)e^{i\omega_s t}]$$

where $E_s(t)$ is the slowly varying envelope containing the information encoded on amplitude and phase of the optical signal. Similarly, the electric field of the local oscillator may be described as:

$$\mathrm{Re}[E_{LO}e^{i\omega_{LO}t}]$$

where $E_{LO}$ is a constant for a local oscillator. The electric field of the light arriving at the photodetector 29 in the top branch of FIG. 1B (or the photodetector 24 in FIG. 1A) is the sum of the two electric fields:

$$E_1 = \mathrm{Re}[E_S(t)e^{i\omega_s t} + E_{LO}e^{i\omega_{LO}t}]$$

and the optical power is:

$$P_1 = E_1^* E_1 = \begin{pmatrix} E_s^*(t)e^{-i\omega_s t} + \\ E_{LO}^* e^{-i\omega_{LO}t} \end{pmatrix} \begin{pmatrix} E_s(t)e^{i\omega_s t} + \\ E_{LO}e^{i\omega_{LO}t} \end{pmatrix} \quad (1)$$

$$P_1 = |E_s(t)|^2 + |E_{LO}|^2 + 2\mathrm{Re}[E_s(t)E_{LO}^* e^{i(\omega_s - \omega_{LO})t}]$$

In the case of single ended detection, only one output of the combiner is used. $|E_{LO}|^2$ is constant with time. $|E_s(t)|^2$ is relatively small, given that the local oscillator power is much larger than the signal power. In addition, for the phase shift keying (PSK) and frequency shift keying (FSK) modulation formats $|E_s(t)|^2$ is constant with time. The dominant term in equation 1 is the beat term $$\mathrm{Re}[E_s(t)E_{LO}^* e^{i(\omega_s - \omega_{LO})t}].$$

The output of the lower branch is the difference of the two electric fields, and the optical power is:

$$P_2 = |E_s(t)|^2 + |E_{LO}|^2 - 2\mathrm{Re}[E_s(t)E_{LO}^* e^{i(\omega_s - \omega_{LO})t}] \quad (2)$$

The other mode of detection is balanced detection, where the electrical circuitry after the photodetectors evaluates the difference in photocurrent between the two detectors:

$$P_1 - P_2 = 4\mathrm{Re}[E_s(t)E_{LO}^* e^{i(\omega_s - \omega_{LO})t}] \quad (3)$$

Balanced detection produces the beat term directly. With balanced detection, there is no need for the constraint that the local oscillator power should be greater than the signal power. It has the additional advantage that noise on the local oscillator is subtracted out.

The following equations refer to the beat term directly, and it is assumed that this term is obtained by single ended detection (without the contribution of other terms) or by balanced detection.

There are two modes of coherent detection: homodyne and heterodyne. With homodyne detection, the frequency difference between the signal and the local oscillator is zero. The local oscillator laser has to be phase locked to the incoming signal in order to achieve this. For homodyne detection the term $e^{i(\omega_s - \omega_{LO})t}$ is 1, and the beat term becomes $$\mathrm{Re}[E_s(t)E_{LO}^*]$$

For the binary phase shift keying (BPSK) modulation format, $E_s(t)$ takes on the value 1 or −1 depending on whether a logical "1" or "0" was transmitted, and the decision circuit can simply act on the beat term directly. Homodyne detection requires that the bandwidth of the photodetector and the subsequent components be close to the bit rate. In addition, homodyne detection gives a better sensitivity than any other way of detecting the signal. Also homodyne detection has an inherent ultranarrow optical filtering capability, in that all regions of the optical spectrum, which are more that the detector bandwidth away from the local oscillator, are rejected. This feature means that homodyne detection can support a higher density of WDM channels than by using passive optical filters for WDM demultiplexing. The homodyne detection method has the disadvantage that the local oscillator must be phase locked to the signal. The local oscillator and signal lasers must be narrow linewidth lasers, such as external cavity semiconductor lasers, which are typically more expensive than the distributed feedback (DFB) laser. Additionally, some polarization management methods do not work with homodyne detection.

With heterodyne detection, there is a finite difference in optical frequency between the signal and local oscillator. All the amplitude and phase information on the signal appears on a carrier at angular frequency $(\omega_s - \omega_{LO})$, known as the intermediate frequency (IF), which can be detected using standard radio detection methods (e.g., synchronous detection, envelope detection or differential detection). Heterodyne detection has the advantage that the local oscillator does not need to be phase locked, and a DFB laser can be used for the LO and the signal lasers. Also it is possible to employ signal processing in the IF to compensate for chromatic dispersion, which is considered impossible to do with homodyne detection by existing techniques. The heterodyne detection processes suffer from the disadvantage that the difference frequency must be at least equal to half the optical spectral width of the signal, about 0.75 times the symbol rate, to avoid a penalty from self-imaging, which requires the bandwidth of the photodetector to be at least 1.5 times the symbol rate. The sensitivity of heterodyne detection is 3 dB worse than homodyne detection. In addition, for heterodyning to work, there must be an empty region in the optical spectrum adjacent to the signal being detected, which constrains the density at which WDM channels can be packed.

A system and method is needed which includes all the advantages of homodyne detection in conjunction with all of the advantages of heterodyne detection. In addition, a system and method is needed which can vary the chromatic dispersion compensation and subtract cross talk from other WDM channels.

Thus, it would be a distinct advantage to have a system and method which incorporates coherent detection of optical signals with digital signal processing to recover a signal when a local oscillator is not phase locked to the signal. It is an object of the present invention to provide such a system and method.

SUMMARY OF THE INVENTION

In one aspect, the present invention is a coherent optical detection system receiving an optical signal in a fiber optics network. The system includes a local oscillator emitting light and a phase diverse hybrid for mixing the incoming optical signal with the local oscillator light in two outputs. The phase diverse hybrid creates two replicas of the incoming optical signal and two replicas of the light from the local oscillator, and then combines one replica of the received signal and one replica of the local oscillator light in one of the outputs, and the other two replicas in the other output. The state of polarization of the optical signal and the light from the local oscillator are close to aligned in each of the two outputs. However, the local oscillator does not have to be phase locked to the incoming optical signal. In addition, the phase relationship between the optical signal and the local oscillator light in a first output of the two outputs is different by approximately 90 degrees compared to the phase relationship between the local oscillator light and the optical signal in a second output of the two outputs. The system also includes at least two photodetectors connected to the two outputs of the phase diverse hybrid. The two photodetectors receive optical signals from the two outputs and convert the optical signals to electrical signals. The received electrical signals are processed to provide a complex representation of the envelope of the electric field of the incoming optical signal. In addition, this coherent detection system may be used when the difference frequency is less that twice the symbol rate.

In another aspect, the present invention is a coherent optical detection system receiving an optical signal in a fiber optics network. This system includes a local oscillator emitting light and a polarization diversity hybrid for generating at least two replicas of the incoming optical signal and local oscillator light. The polarization diversity hybrid combines the incoming optical signal and the local oscillator light into at least two outputs. The state of polarization of the first replica of the optical signal relative to the local oscillator light at the first output of the two outputs is close to orthogonal to the state of polarization of the second replica of the optical signal relative to the local oscillator light at the second output of the two outputs. The system also includes at least two photodetectors connected to the two outputs of the polarization diversity hybrid. The two photodetectors receive optical signals from the two outputs. In addition, the system includes at least two A/D converters to receive electrical signals from the two photodetectors. The two A/D converters digitize the received electrical signals. A digital signal processor is utilized to perform computations on digitized values converted by the two A/D converters to obtain information carried by the incoming optical signal. The system enables information on the incoming optical signal to be recovered irrespective of the state of polarization of the incoming signal.

In another aspect, the present invention is a coherent optical detection system receiving an optical signal in a fiber optics network. The optical signal comprises two different optical signals that have been polarization multiplexed together. The coherent optical detection system includes a local oscillator emitting light and a polarization diversity hybrid for generating at least two replicas of the incoming optical signal and local oscillator light. The polarization diversity hybrid combines the incoming optical signal and the local oscillator light into at least two outputs. The state of polarization of the first replica of the optical signal relative to the local oscillator light at the first output of the two outputs is close to orthogonal to the state of polarization of the second replica of the optical signal relative to the local oscillator light at the second output of the two outputs. The system also includes at least two photodetectors connected to the two outputs of the polarization diversity hybrid. The two photodetectors receive optical signals from the two outputs. In addition, the system includes at least two A/D converters to receive electrical signals from the two photodetectors. The two A/D converters digitize the received electrical signals. A digital signal processor is utilized to perform computations on digitized values converted by the two A/D converters to obtain information carried by each of the polarization multiplexed tributaries comprising the incoming optical signal.

In another aspect, the present invention is a coherent optical detection system receiving an optical signal in a fiber optics network. The system includes a local oscillator emitting light and an optical mixing hybrid for combining the incoming optical signal and the local oscillator light into at least one output. A photodetector is connected to the output of the optical mixing hybrid and receives optical signals from the output. The system also includes an A/D converter to receive electrical signals from the photodetector and digitize the electrical signals. A digital signal processor performs computations on digitized values converted by the A/D converter. The digital signal processor estimates a complex envelope of an electric field of the incoming optical signal and performs a signal processing operation on a plurality of samples over time of the complex envelope of the electric field.

In another aspect, the present invention is a coherent optical detection system receiving an optical signal having a plurality of wave division multiplexed (WDM) channels. The system includes at least one local oscillator emitting light and an optical mixing hybrid for combining the incoming optical signal and the local oscillator light into at least one output. The system also includes a photodetector connected to the output of the optical mixing hybrid to receive optical signals from the output. An A/D converter receives electrical signals from the photodetector and digitizes the electrical signals. A digital signal processor performs computations on digitized values converted by the A/D converter. The digital signal processor estimates information carried on one of the plurality of WDM channels while accounting for the other WDM channels and subtracting crosstalk from the plurality of WDM channels.

In still another aspect, the present invention is a coherent optical detection system receiving an optical signal in a fiber optics network. The system includes a local oscillator emitting light and an optical mixing hybrid. The local oscillator does not have to be phase locked to the incoming optical signal. Within the optical mixing hybrid at least four replicas of the incoming optical signal and four replicas of the light from the local oscillator are generated, and replicas of the incoming signal and local oscillator are combined into at least four outputs. The phase or state of polarization of the local oscillator light relative to the incoming signal at the first output is different from the phase or state of polarization at the other three outputs, and similarly for the second, third and fourth outputs. Four photodetectors are connected to the four outputs of the mixing hybrid and receive optical signals from the four outputs and convert them to electrical signals. In addition, four A/D converters digitize the received electrical signals. A digital signal processor performs computation on digitized values from the four A/D converters to obtain information carried by the received signal without limitation to the state of polarization of the received optical signal.

DESCRIPTION OF THE INVENTION

Figure 1A:
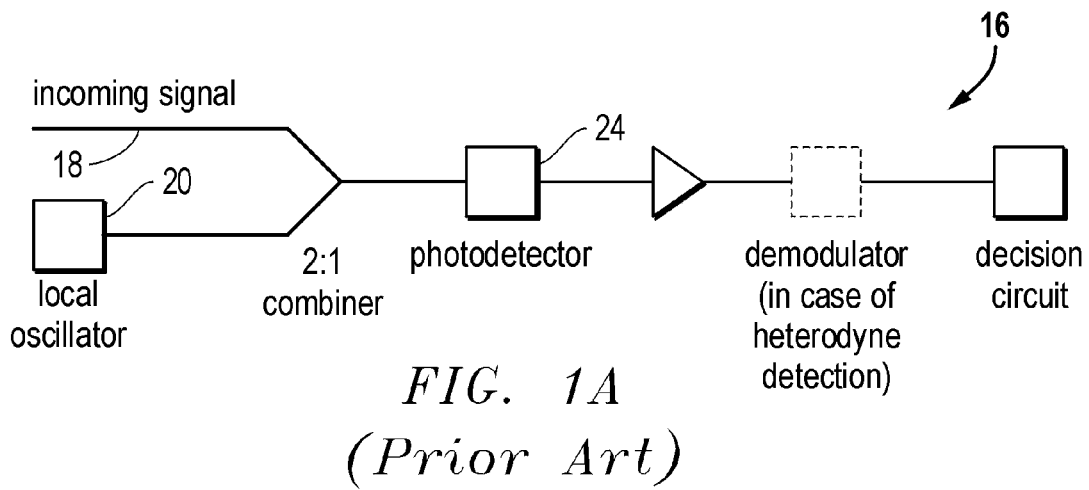
FIG. 1A (Prior Art) illustrates a simplified block diagram of a single ended basic coherent receiver 16 in an existing fiber optics system.
Figure 1B:
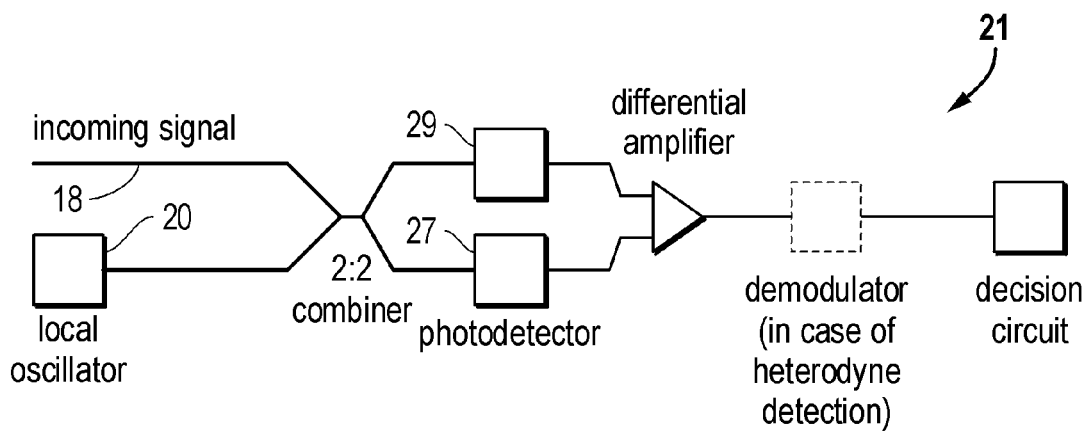
FIG. 1B (Prior Art) illustrates a simplified block diagram of a coherent receiver 21 using balanced detection in an existing fiber optics system.
Figure 2A:
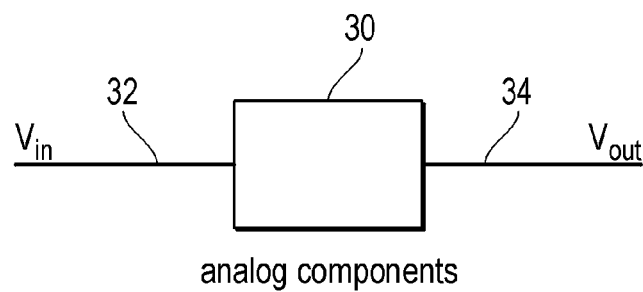
FIG. 2A is a simplified block diagram illustrating the components of a generic analog signal processor (ASP)
Figure 2B:
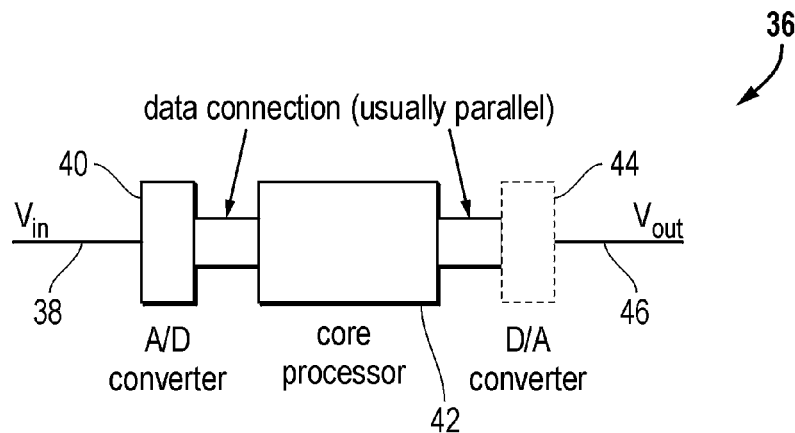
FIG. 2B is a simplified block diagram illustrating the components of a generic digital signal processor.

In the present invention, digital signal processing (DSP) is employed to recover optical signals. Mr. Richard Lyons in "Understanding Digital Signal Processing" discloses the basic principles behind DSP. FIG. 2A is a simplified block diagram illustrating the components of a generic analog signal processor (ASP) 30. A signal processor is a unit, which takes in a signal, typically a voltage vs. time, and performs a predictable transformation on it. This transformation may be described by a mathematical function. The ASP 30 transforms an input signal voltage 32 into an output signal voltage 34. The ASP may utilize capacitors, resistors, inductors, transistors, etc. to accomplish this transformation. FIG. 2B is a simplified block diagram illustrating the components of a generic digital signal processor 36. An input signal 38 is digitized by an analog to digital (A/D) converter 40 that is converted into a sequence of numbers. Each number represents a discrete time sample. A core processor 42 uses the input numerical values to compute the required output numerical values, according to a mathematical formula that produces the required signal processing behavior. The output values are then converted into a continuous voltage vs. time output signal 46 by a digital to analog (D/A) converter 44. Alternatively, for applications in a digital signal receiver, the analog output of the DSP may go into a decision circuit to produce a digital output. In such a situation, the digital processing core may perform the decision operation and output the result, in which case the D/A 44 is not needed.

There are disclosures on equalization (signal processing) to correct for fiber optic transmission impairments [see "Electronic PMD mitigation-from linear equalization to maximum-likelihood detection" by H. Bulow et al. (Bulow 1) and "Electronic equalization of transmission impairments" by H. Bulow et al. (Bulow 2)]. In this disclosure, direct detection is used and the equalizer is located after the detector. Most of the existing works are on analog signal processing, although digital signal processing has been proposed and simulated [see "Design of near optimum electrical equalizers for optical transmission in the presence of PMD" by H. F. Haunstein et al. (Haunstein) and "DSP-Based Equalization for Optical Channels-Feasibility of VLSI Implementation" by O. Agazzi (Agazzi)]. The present invention uses DSP to correct transmission impairments, but is used in conjunction with coherent detection.

Quadrature Sampling

How Quadrature Sampling Works

Figure 3A:
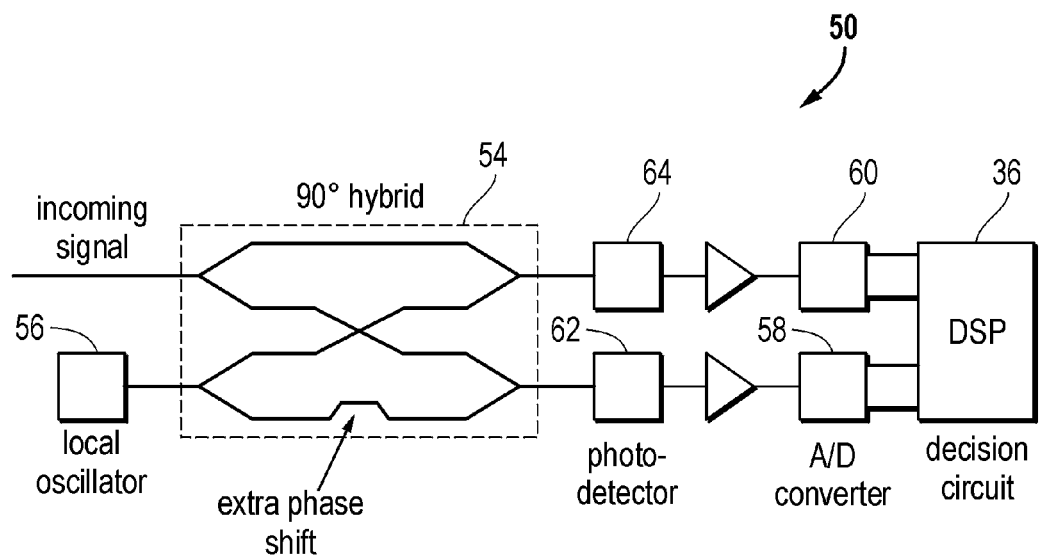
FIG. 3A illustrates a simplified block diagram of a single ended quadrature sampling receiver in the preferred embodiment of the present invention.

The present invention provides for recovery of information on an optical signal using a local oscillator which is not phase locked to the signal, and which may have an optical frequency arbitrarily close to that of the signal. FIG. 3A illustrates a simplified block diagram of a single ended quadrature sampling receiver 50 in the preferred embodiment of the present invention. A 90° hybrid passive unit 54 is depicted within the dotted box. The method of recovering a digital representation of the complex envelope of the signal electric field is known herein in the present invention as quadrature sampling. The 90° hybrid passive unit mixes the signal with a local oscillator 56 in two paths, such that the phase difference between the signal and LO 56 in one path differs from the phase difference in the other path by about 90°. There are many ways to make the 90° hybrid. As illustrated in FIG. 3A, the 90° hybrid passive unit splits both the signal and LO and then combines in each output arm a replica of the signal with a replica of the LO. However, there is an extra path length in one arm of the LO splitter to apply the phase shift. The electric field of the local oscillator may be written as $$\mathrm{Re}[E_{LO}e^{i\omega_{LO}t}]$$

for the top path and $$\mathrm{Re}[iE_{LO}e^{i\omega_{LO}t}]$$

for the bottom path, while the signal is $\mathrm{Re}[E_s(t)e^{i\omega_s t}]$ in both paths. After mixing the LO with the signal, the beat term for the top path is, following equation 2 or 3:

$$\text{beat term } 1 = \mathrm{Re}[E_s(t)E_{LO}^* e^{i(\omega_s - \omega_{LO})t}] \qquad (4)$$

and for the lower arm:

$$\text{beat term } 2 = \mathrm{Re}[-iE_s(t)E_{LO}^* e^{i(\omega_s - \omega_{LO})t}] \qquad (5)$$
$$\text{beat term } 2 = \mathrm{Im}[E_s(t)E_{LO}^* e^{i(\omega_s - \omega_{LO})t}]$$

Two A/D converters 58 and 60, utilized after the photodetectors 62 and 64, in the two paths convert the photocurrents proportional to these two beat terms into a sequence of numerical values versus time. The digital signal processor unit 36 accepts inputs from the A/D converters in both paths. The DSP is capable of doing computations on complex numbers. The DSP is also able to calculate from its inputs, the complex envelope of the signal electric field, $E_s(t)$, using the following formula:

$$E_s(t) = \frac{e^{-i(\omega_s - \omega_{LO})t}}{E_{LO}^*}[(\text{beat term 1}) + i(\text{beat term 2})] \quad (6)$$

Equation 6 is obtained by Combining equations 4 and 5. The equation may be written in terms of only real quantities as:

$$\text{Re}[E_s(t)] = \frac{1}{|E_{LO}|}\begin{bmatrix} \cos((\omega_s - \omega_{LO})t - \phi)(\text{beat term 1}) + \\ \sin((\omega_s - \omega_{LO})t - \phi)(\text{beat term 2}) \end{bmatrix} \quad (7a)$$

$$\text{Im}[E_s(t)] = \frac{1}{|E_{LO}|}\begin{bmatrix} -\sin((\omega_s - \omega_{LO})t - \phi)(\text{beat term 1}) + \\ \cos((\omega_s - \omega_{LO})t - \phi)(\text{beat term 2}) \end{bmatrix} \quad (7b)$$

$\phi$ is the argument (phase angle) of $E_{LO}$. This method of recovering a digital representation of a complex signal is known as quadrature sampling. This method may also be referred to as a heterodyne detection followed by synchronous demodulation using a complex local oscillator and digital phase estimation. Although quadrature sampling is used in radio communications, it has never been applied to the detection of an optical signal before. By combining sampled values from the two paths of the 90° hybrid passive unit into complex numbers, it is possible to perform heterodyne detection without problems from self-imaging even when the IF is much lower than the bit rate. Equation 6 assumes that the two beat terms are effectively sampled at the same instant. If the path lengths are not equal from the signal splitter to the two A/Ds, then this will cause timing skew. The DSP can compensate for the skew by using an elastic buffer store at one of its inputs.

The rotating phasor in equation 6, $e^{-i(\omega_s - \omega_{LO})t}/E_{LO}^*$, contains $(\omega_s - \omega_{LO})t - \phi$, the phase of the signal with respect to the LO, which is not provided directly to the DSP and must be calculated by it from beat term 1 and beat term 2. Only when the estimate of $(\omega_s - \omega_{LO})t - \phi$ is correct continuously over time (when the phase estimation algorithm is locked) may the data be recovered with a low bit error rate. After locking has occurred, the phase term wanders because of the finite linewidth of the signal and LO lasers over a time of typically many bit periods. The phase estimation algorithm must then track this phase wander. There are many types of phase estimation algorithm that can be implemented within the DSP, as described in "Digital Communications" by John G. Proakis (Proakis). If the modulation format of the incoming signal contains a pilot carrier then a digital phase locked loop (PLL) or an open loop phase estimation algorithm can be applied to (beat term 1)+i(beat term 2) directly. An example of an open loop phase estimation algorithm is taking the arctangent of the ratio (beat term 2)/(beat term 1) followed by a low pass filter function. When the signal's modulation format is such that it contains no carrier then (beat term 1)+i(beat term 2) must first be processed by a single line generation function, such as a squaring function (or power law function in the case of high order PSK), or a decision directed multiplication, or in a Costas loop which combines the single line generation function with the PLL. An alternative method of estimating the phase is to make use of known sequences of symbols that are repeated in the transmitted signal every time interval $\tau_{seq}$, but this kind of method is useful only when the frequency difference between the signal and local oscillator is small, less than $1/2\tau_{seq}$.

Receivers of digital information generally employ a decision circuit which is clocked (makes a decision) at a frequency exactly equal to the symbol frequency. A clock recovery circuit is used to derive a clock signal from the incoming data stream. The clock recovery circuit may be accomplished within a separate analog circuit separate from the DSP or, in an alternate embodiment of the present invention, located in the same package as the DSP logic gates. In the present invention, the sample rate of the A/D converters may be set equal to the symbol frequency by the clock recovery circuit. Alternatively, the A/D converters may be clocked faster than the symbol frequency by a clock that is asynchronous with the symbol frequency (usually at least 2× faster), and the sample values at the center of the symbol may be estimated by the DSP using an interpolation method.

Like any optical receiver, the coherent receiver will, in general, have a finite baseband bandwidth, usually associated with a lowpass response. This finite bandwidth serves the useful purpose of limiting the amount of noise seen by the receiver, and when the receiver is used to detect one of many WDM channels, the finite baseband bandwidth also determines the ability to reject neighboring channels. Filter components can be purposely inserted in the receiver to limit the bandwidth, or the natural response (e.g., of the photodetector) can be exploited, or a digital filter function implemented within the DSP can be used. One kind of purposely inserted filter is the integrate-and-dump filter, which has the property that a neighboring WDM channel is completely rejected, provided it is centered on an orthogonal frequency. For most other filter responses that might be used, the concept of a set of orthogonal frequencies does not apply, and the neighboring WDM channel must be separated by a certain minimum frequency offset to be adequately rejected.

The values of $\text{Re}[E_s(t)]$ and $\text{Im}[E_s(t)]$ within the digital signal processor are the same as the detected optical powers that would be observed in the two arms of a conventional phase and quadrature homodyne detection system, such as with the QPSK receiver disclosed in "Linewidth requirements for optical synchronous detection systems with non-negligible loop delay time," by S. Norimatsu and K. Iwashita (Norimatsu). Such a conventional receiver needs to have the local oscillator phase locked to the incoming optical signal, unlike the present invention. The digital information is obtained from $E_s(t)$ by applying the function of a decision circuit within the DSP. For example, for BPSK $E_s$ takes on values [1,−1], and the decision circuit function operates on $\text{Re}[E_s]$ with a threshold close to zero; $\text{Im}[E_s]$ may then be ignored. For quadrature phase shift keying (QPSK), $E_s$ takes on values [1+i,−1+i,1−i,−1−i], (i.e. two bits per symbol). Separate decisions are made on $\text{Re}[E_s]$ and $\text{Im}[E_s]$ to give the two bits of content of the symbol.

For some applications, such as the detection of a BPSK signal, the entire complex envelope of the electric field of the incoming signal does not need to be evaluated; only one component, such as the real part of the complex envelope, is wanted. Examples of a component of the complex envelope of the electric field are $\text{Re}[E_s(t)]$, $\text{Im}[E_s(t)]$ and $\text{Re}[E_s(t)e^{i\theta}]$, where $\theta$ is a constant.

Figure 3B:
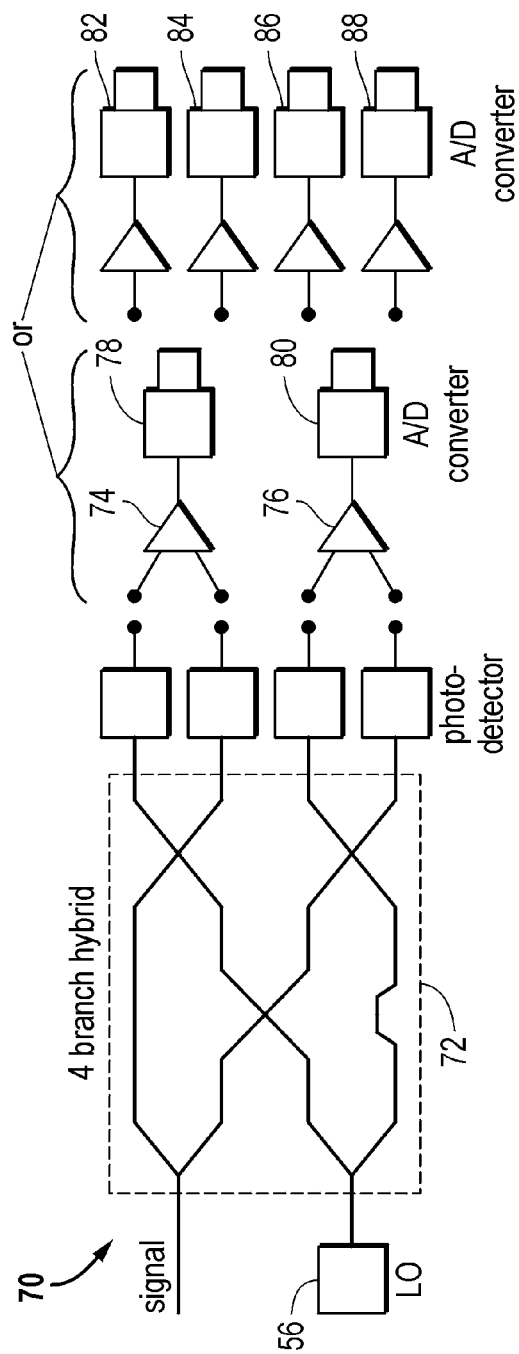
FIG. 3B illustrates a simplified block diagram of a balanced quadrature sampling receiver in a first alternate embodiment of the present invention.

FIG. 3B illustrates a simplified block diagram of a balanced quadrature sampling receiver 70 in a first alternate embodiment of the present invention. Each of the phase diverse arms is further split into two balanced arms. The contents of the dashed box are a four branch phase diversity hybrid unit 72. To perform the subtraction of detected signals associated with balanced detection, either two differential amplifiers 74 and 76 may be used followed by A/D converters 78 and 80, or four separate A/D converters 82, 84, 86, and 88 can be used and the balanced detection result obtained by subtraction within the DSP.

If the phase shift imposed by the hybrid is not 90°, but given by $e^{i\theta}$, the quadrature sampling process can still be applied by replacing equation 6 with $$E_s(t) = \frac{e^{-i(\omega_s - \omega_{LO})t}}{E_{LO}^*}\left[(\text{beat term 1}) + i\left(\frac{(\text{beat term 2}) - \cos\theta(\text{beat term 1})}{\sin\theta}\right)\right] \quad (8)$$

Only when $\theta$ is close to 0 or $\pi$ (180°), does the quadrature detection scheme fail completely.

Comparison of Quadrature Sampling with Prior Art

Techniques such as phase switching and phase diversity have been developed to implement coherent detection with a local oscillator close to the signal's optical frequency but not phase locked to it. Phase switching has been demonstrated only with the differential phase shift keying (DPSK) modulation format (see "1 Gbit/s zero-IF DPSK coherent optical system using a single photodetector" by J. M. Kahn). The phase of the signal is modulated at the transmitter at a frequency equal to the symbol rate. At the coherent receiver, this modulation is removed by a DPSK discriminator, which does not depend on the phase difference between the signal and the local oscillator. Therefore, there is no need to phase lock the LO to the signal. This existing method has the disadvantage that the extra phase modulation broadens the optical signal, so that the same bandwidth detector is needed as for heterodyne detection. Additionally, the broadening of the optical signal makes the optical signal more subject to fiber propagation impairments.

In another existing method as disclosed in "Phase- and polarization-diversity coherent optical techniques" by L. G. Kazovsky (Kazovsky 1), phase diversity detection, a 90° hybrid is used to obtain inphase and quadrature components. These two signals are combined to give a single output that goes to a decision circuit. The exact method of combining the two signals depends on the modulation format. For example, for amplitude shift keying (ASK) the inphase and quadrature signals are squared by analog components and then summed together as disclosed in "Wide-linewidth phase diversity homodyne receivers" by L. G. Kazovsky (Kazovsky 2). The result again does not depend on the phase difference between the signal and the local oscillator. Phase diversity detection only works with ASK, DPSK and FSK modulation formats. Thus, the existing methods cannot use the BPSK and QPSK formats, which provide the best sensitivity.

Another variety of phase diversity which has been proposed is a double stage phase diversity detection (DSPD) method disclosed in "Double-stage phase-diversity optical receiver: Analysis and experimental confirmation of the principle" by T. Okoshi and S. Yamashita (Okoshi). The inphase and quadrature signals are each multiplied by a sine wave and then summed, so as to generate a virtual IF signal, from which information can be recovered in the same way as for a standard heterodyne IF signal. This method has the advantage that a low bandwidth detector can be used, as for homodyne detection, but it has the disadvantage that the subsequent components need to work at high IF frequencies.

Polarization Management

Existing Methods of Polarization Tracking

The local oscillator beats with the optical signal only if it is to some extent aligned in polarization with the signal. As discussed above, it has been assumed that the states of polarization (SOPs) are aligned. When the SOPs are orthogonal, the beat term of equations 2 and 3 is zero and coherent detection is not possible. The SOP of the local oscillator may be fixed, but the signal's SOP typically varies over time because of small changes in the environmental conditions of the long transmission fiber link. Although these changes are slow, they cannot be predicted. Therefore, a field deployable coherent receiver requires a mechanism to match the local oscillator SOP with the signal SOP (i.e., to avoid the condition where the local oscillator is orthogonal to the signal). There are three ways to do this: adaptive polarization control, polarization scrambling, and polarization diversity.

In polarization control as disclosed in "Comparison of polarization handling methods in coherent optical systems" by R. Noe et al. (Noe) and "Progress towards the field deployment of coherent optical fiber systems" by M. C. Brain et al. (Brain), either the signal or the local oscillator passes through a polarization controller, typically comprising a series of waveplates. These waveplates are continuously adjusted under microprocessor control so that the SOPs of the signal and LO are aligned. The control of polarization must be endless (i.e., the polarization controller does not reach a certain state and can go no farther).

To achieve polarization scrambling, which is described in "Polarization switching techniques for coherent optical communications by I. M. I. Habbab and L. J. Cimini (Habbab) and Noe, an extra modulation element is included in the transmitter, which changes the SOP of the signal substantially within one symbol period. At the receiver, the coherent beat term is effectively an average of all the relative SOPs, aligned and orthogonal, during the bit period, thus avoiding persistent orthogonality. Polarization scrambling suffers from the disadvantage of utilizing an expensive scrambler element in the transmitter. In addition, the act of scrambling broadens the linewidth of the signal, which limits the density of WDM channels and makes the signal more susceptible to fiber propagation impairments.

Figure 4A:
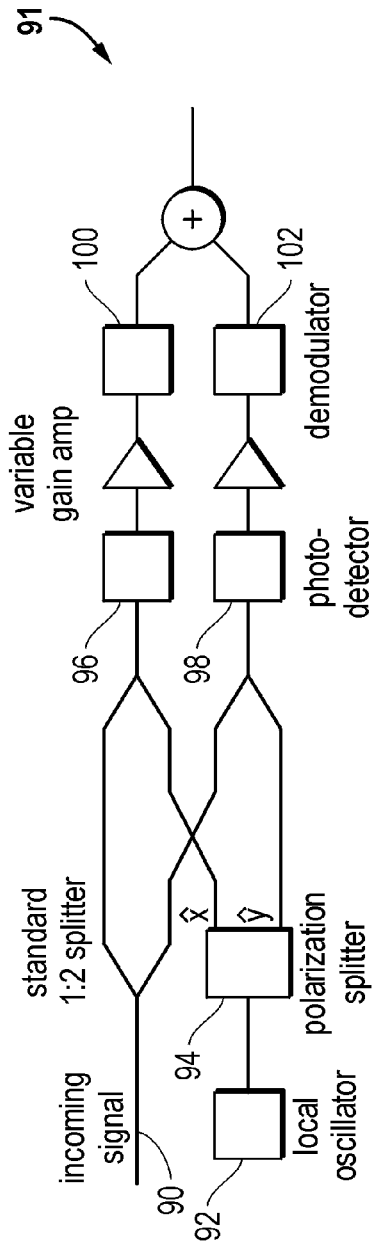
FIG. 4A is a simplified block diagram of an existing configuration for polarization diversity detection.

FIG. 4A is a simplified block diagram of an existing configuration 91 for polarization diversity detection. This solution is described in Noe. The signal 90 and local oscillator 92 are each divided into two paths (in addition to any splitting of paths for balanced detection or phase and quadrature detection). The splitting of the LO by a polarization splitter 94 is such that its SOP in the two paths is orthogonal (e.g., horizontal in the top path and vertical in the lower path). The SOP of the signal is the same in the two paths. There are two separate coherent receivers (photodetectors 96 and 98) in the two paths, and their outputs are summed together after demodulation of the IF, by demodulators 100 and 102. Then the summed result is passed to the decision circuit. Within this configuration, immunity to the varying incoming signal SOP is achieved because in the situation where one path has the LO and signal SOPs orthogonal, they are aligned in the other path. The variable gain amplifiers in the two paths are used to avoid a variation of the peak-to-peak magnitude of the summed signal due to changes in the incoming signal SOP, as discussed in "Signal processing in an optical polarization diversity for 560-Mbit/s ASK heterodyne detection" by B. Enning et al. (Enning). In addition, with polarization diversity, it is possible for the incoming signal SOP to vary in a manner which does not cause the relative power aligned with the LO in the two arms to change, but it is equivalent to the phase of the signal relative to the LO changing continuously (beyond $2\pi$) in one arm, while the phase of the signal is fixed with respect to the LO in the other arm. However, for homodyne detection, it is necessary to have zero phase difference between the signal and local oscillator (i.e., phase locking) in both arms of the polarization diverse configuration. Therefore, polarization diversity cannot be used with homodyne detection. U.S. Pat. No. 5,322,258 to Tsuchima (Tsushima) disclosed using an electro-optic phase modulator in one arm of the LO to ensure that the phase is matched, but in fact electro-optic modulators provide only a limited range of phase shift, and therefore does not provide endless polarization tracking.

The present invention may utilize a modification of this polarization diversity process. As discussed above, the signal and LO envelopes have been assigned complex scalar variables $E_s(t)$ and $E_{LO}$. The polarization nature is included by multiplying these scalar quantities by a Jones unit vector, so $E_s(t)$ becomes $E_s(t)\hat{p}_s$ and $E_{LO}$ becomes $E_{LO}\hat{p}_{LO}$. The use of Jones vectors to represent polarization states is summarized in Appendix A. The result of coherent beating that appeared previously in equations 2 and 3 becomes:

$$\text{beat term} = \text{Re}[E_s(t)E_{LO}^* e^{i(\omega_s-\omega_{LO})t} \hat{p}_s \cdot \hat{p}_{LO}^*]$$

$\hat{p}_s \cdot \hat{p}_{LO}^*$ is 1 when the LO and signal SOPs are aligned, and 0 when they are orthogonal. The LO has mutually orthogonal SOPs in the two polarization diversity paths, which may be represented as the (real) Jones unit vectors $\hat{x}$ and $\hat{y}$. The beat terms in the two paths are:

$$\text{beat } term_x = \text{Re}[E_s(t)E_{LO}^* e^{i(\omega_s-\omega_{LO})t} \hat{p}_s \cdot \hat{x}]$$

$$\text{beat } term_y = \text{Re}[E_s(t)E_{LO}^* e^{i(\omega_s-\omega_{LO})t} \hat{p}_s \cdot \hat{y}]$$

The issue described above that prevents polarization diversity being used with homodyne detection may be summarized as follows: $\hat{p}_s \cdot \hat{x}$ and $\hat{p}_s \cdot \hat{y}$ are complex quantities whose phase can vary independently over time. With homodyne detection, the function of the phase locked loop on the local oscillator is to adjust the phase of $E_{LO}$ to compensate for any phase changes in the incoming signal. However, it is not possible to keep constant both $E_{LO}^* \hat{p}_s \cdot \hat{x}$ and $E_{LO}^* \hat{p}_s \cdot \hat{y}$.

Polarization Tracking Using the Present Invention

Figure 5:
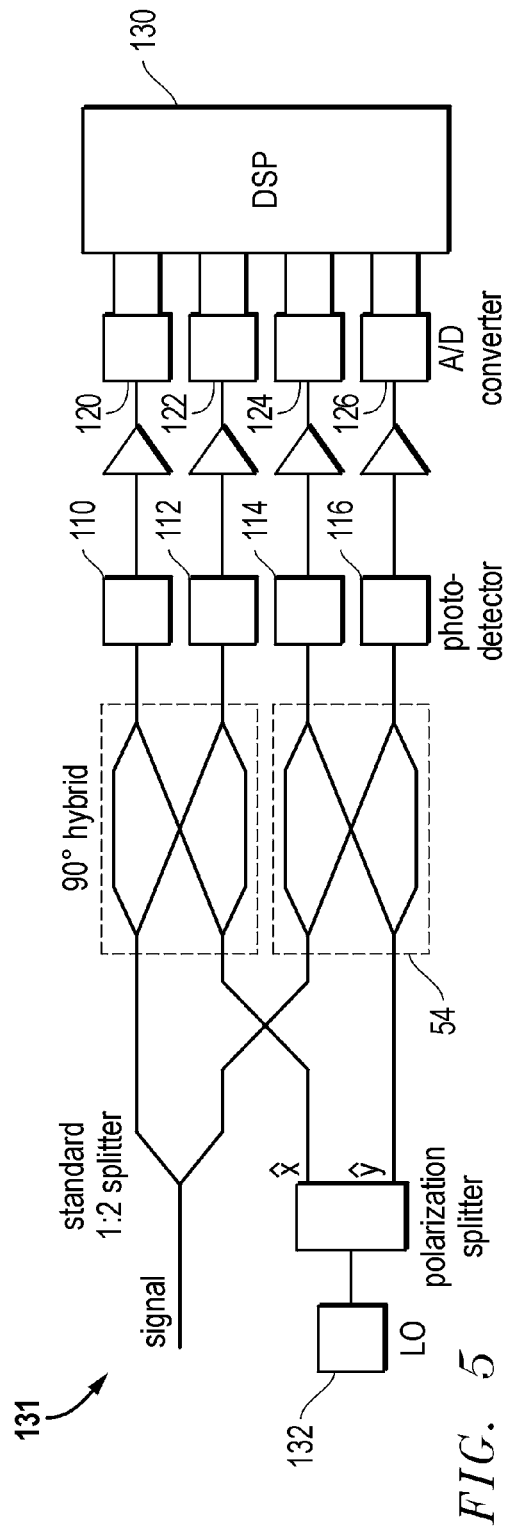
FIG. 5 is a simplified block diagram illustrating a polarization tracking system 131 in the preferred embodiment of the present invention.

In the preferred embodiment of the present invention, polarization tracking is achieved by adding polarization diversity to the phase diversity (90° hybrid arrangement) discussed above. FIG. 5 is a simplified block diagram illustrating a polarization tracking system 131 in the preferred embodiment of the present invention. This configuration includes four photodetectors 110, 112, 114, and 116 (assuming single ended detection) and four A/D converters 120, 122, 124, 126, going to the DSP 130. If a LO 132 is divided into polarizations $\hat{x}$ and $\hat{y}$, the four beat terms are:

$$\text{beat term } 1_x = \text{Re}[E_s(t)E_{LO}^* e^{i(\omega_s-\omega_{LO})t} \hat{p}_s \cdot \hat{x}] \quad (9a)$$

$$\text{beat term } 1_y = \text{Re}[E_s(t)E_{LO}^* e^{i(\omega_s-\omega_{LO})t} \hat{p}_s \cdot \hat{y}] \quad (9b)$$

$$\text{beat term } 2_x = \text{Im}[E_s(t)E_{LO}^* e^{i(\omega_s-\omega_{LO})t} \hat{p}_s \cdot \hat{x}] \quad (9c)$$

$$\text{beat term } 2_y = \text{Im}[E_s(t)E_{LO}^* e^{i(\omega_s-\omega_{LO})t} \hat{p}_s \cdot \hat{y}] \quad (9d)$$

In the case discussed above where the polarization behavior was ignored, quadrature sampling was utilized by forming complex numbers from the two inputs to the DSP and processing them according to equation 6. With the polarization diversity configuration, a Jones vector is formed from the four inputs to the DSP, and the signal electric field is calculated from:

$$E_s(t) = \frac{e^{-i(\omega_s-\omega_{LO})t}}{E_{LO}^*} \begin{pmatrix} (\text{beat term } 1_x) + i(\text{beat term } 2_x) \\ (\text{beat term } 1_y) + i(\text{beat term } 2_y) \end{pmatrix} \cdot \hat{p}_s^* \quad (10)$$

To use equation 10 it is necessary to know $\hat{p}_s$. This quantity can be estimated from:

$$\hat{p}_s = \sqrt{\frac{1}{1+|R|^2}} \begin{pmatrix} 1 \\ R \end{pmatrix}$$

where:

$$R = \overline{\left[\frac{(\text{beat term } 1_y) + i(\text{beat term } 2_y)}{(\text{beat term } 1_x) + i(\text{beat term } 2_x)}\right]}$$

The time average is preferably calculated over many bit periods to average out any additive amplified spontaneous emission noise. However, $\hat{p}_s$ should be reevaluated sufficiently frequently so the changes in SOP of the incoming signal are tracked.

With the present invention, this novel polarization diversity method is able to operate within the scenario that could not be tracked when using homodyne detection with existing methods. If $\hat{p}_s \cdot \hat{x}$ and $\hat{p}_s \cdot \hat{y}$ evolve in phase differently from one another, then equation 10 may still be applied. In such a circumstance, it will involve multiplying the top Jones vector element by a different phase factor from the bottom vector element. Because it is a mathematical multiplication that is done within the DSP 130, there is no constraint that the phase factor cannot be arbitrary as with an existing electro-optic phase modulator. Thus the present invention may be used with, for example, BPSK and QPSK modulation formats and provides the same sensitivity as for homodyne detection (i.e., the best possible sensitivity of any modulation format).

The application of the polarization diverse process of FIG. 4A provides more than just a complex representation of the signal that is calculated within the DSP 130, but additionally, it is a Jones vector representation that is obtained, which contains all the polarization information. The Jones vector $E_s(t)$ is given by:

$$E_s(t) = \frac{e^{-i(\omega_s-\omega_{LO})t}}{E_{LO}^*} \begin{pmatrix} (\text{beat term } 1_x) + i(\text{beat term } 2_x) \\ (\text{beat term } 1_y) + i(\text{beat term } 2_y) \end{pmatrix} \quad (11)$$

Recovery of Signals Using Other Phase-Polarization Combinations

The passive unit 54 discussed above combines the signal and local oscillator into four different arms. The SOPs of the local oscillator in two arms are orthogonal relative to the other two arms (polarizations $\hat{x}$ and $\hat{y}$). Thus, a pair of arms having the same SOP also have phases that are 90° apart. The Jones vectors of the LO in the four arms are:

$$\begin{pmatrix}1\\0\end{pmatrix}\begin{pmatrix}i\\0\end{pmatrix}\begin{pmatrix}0\\1\end{pmatrix}\begin{pmatrix}0\\i\end{pmatrix} \quad (12)$$

These four Jones vectors can be considered to be orthogonal with respect to one another.

The signal SOP and phase in the four arms is assumed to be the same. The relative phase of the local oscillator to the signal is particularly important in the quadrature sampling process. For example, quadrature sampling may be used if the local oscillator has the same SOP and phase in the four arms and the optical signal has the four Jones vector above. However, in discussions below, the LO polarization/phase is assumed to be different for the four arms and the signal polarization/phase the same for the four arms.

The signal may be recovered even if the LO Jones vector does not take on the four mutually orthogonal values listed above, although the best result is obtained when these mutually orthogonal values are used. In a typical detection subsystem, noise is accumulated after photodetection, such as from thermal noise in the photodetector and digitization noise in the A/D converter. When the LO Jones vectors are not optimal, the effective amount of post-detection noise is increased.

Following the notation that the x-component of a Jones vector is denoted by adding suffix x, etc., with the Jones vectors of the LO in the four arms is $\hat{p}_1$, $\hat{p}_2$, $\hat{p}_3$ and $\hat{p}_4$, and the corresponding photodetector outputs are beat term 1 ... beat term 4, then the signal can be calculated from:

$$\begin{pmatrix}\mathrm{Re}[E_{sx}(t)]\\ \mathrm{Im}[E_{sx}(t)]\\ \mathrm{Re}[E_{sy}(t)]\\ \mathrm{Im}[E_{sy}(t)]\end{pmatrix} = \quad (13)$$

$$\frac{e^{-i(\omega_s-\omega_{LO})t}}{E^*_{LO}}\begin{pmatrix}\mathrm{Re}[\hat{p}_{1x}] & \mathrm{Im}[\hat{p}_{1x}] & \mathrm{Re}[\hat{p}_{1y}] & \mathrm{Im}[\hat{p}_{1y}]\\ \mathrm{Re}[\hat{p}_{2x}] & \mathrm{Im}[\hat{p}_{2x}] & \mathrm{Re}[\hat{p}_{2y}] & \mathrm{Im}[\hat{p}_{2y}]\\ \mathrm{Re}[\hat{p}_{3x}] & \mathrm{Im}[\hat{p}_{3x}] & \mathrm{Re}[\hat{p}_{3y}] & \mathrm{Im}[\hat{p}_{3y}]\\ \mathrm{Re}[\hat{p}_{4x}] & \mathrm{Im}[\hat{p}_{4x}] & \mathrm{Re}[\hat{p}_{4y}] & \mathrm{Im}[\hat{p}_{4y}]\end{pmatrix}^{-1}$$

$$\begin{pmatrix}\text{beat term 1}\\ \text{beat term 2}\\ \text{beat term 3}\\ \text{beat term 4}\end{pmatrix}$$

Equation 11 is a special case of equation 13 for $\hat{p}_1$ to $\hat{p}_4$ given by equation 12. The four $\hat{p}_i$ Jones vectors must be distinct from one another. If one of the $\hat{p}_i$ is equal to another, or −1 multiplied by another (180° phase shift), then the 4×4 matrix in equation 13 cannot be inverted. Therefore, $E_s(t)$ cannot be determined.

Thus, the quadrature sampling process may be used to determine the amplitude, phase, and polarization information of a signal. An apparatus is used which contains a local oscillator and four independent photodetectors. Each photodetector is exposed to a sum of signal light and local oscillator light. The optical phase of the LO compared to the signal or the state of polarization of the LO compared to the signal must be distinct between the inputs to the four photodetectors. Specifically, no two photodetectors must see substantially the same relative phase and the same relative SOP. (A phase difference of 180° is considered to be the same as 0°. The requirement is that the four photodetectors see distinct Jones vectors of the LO compared to the signal.) Two Jones vectors $p_1$ and $p_2$ are defined as being not distinct if there is a real number K such that $p_1 = Kp_2$. An apparatus can be used that employs more than four photodetectors, if it is possible to select four photodetectors from the total that have distinct Jones vectors of the LO relative to the signal.

In the preferred embodiment of the present invention, the local oscillator laser is usually located in the vicinity of the coherent receiver (i.e. it is "local"). However, in alternate embodiments of the present invention, the local oscillator may be remotely located from the coherent receiver.

The replicas of the local oscillator that fall on the multiple photodetectors used in quadrature sampled detection are typically obtained by dividing the light from a single local oscillator laser, but in fact they can be obtained from many local oscillator lasers that are phase locked to one another. In addition, the local oscillator can be derived from the incoming signal by stripping the modulation sidebands from the signal.

Figure 4B:
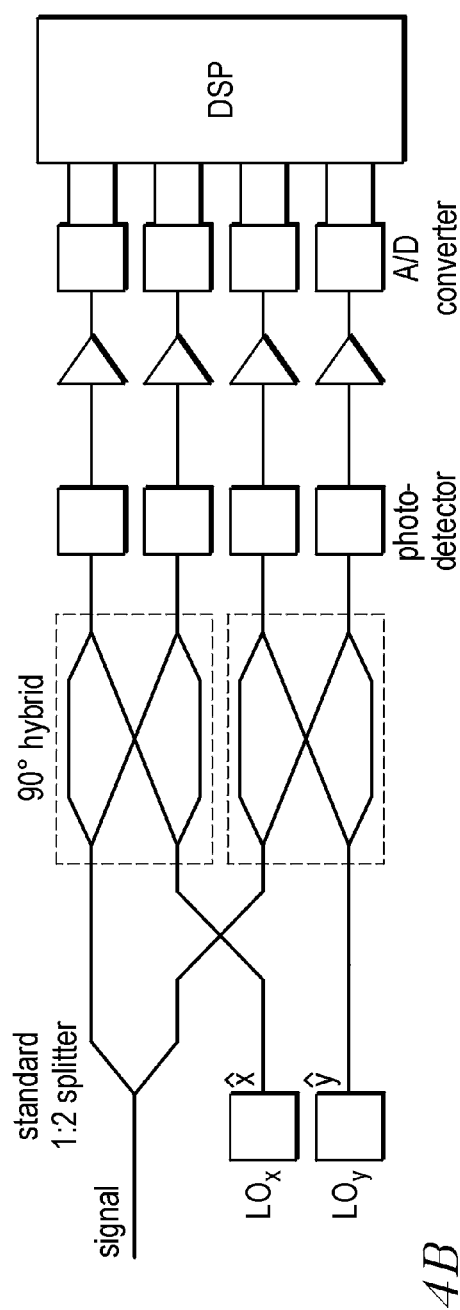
FIG. 4B is a simplified block diagram of a configuration using two LO lasers for polarization diversity detection.

Another way that the quadrature sampling process may be used to obtain a representation of the signal, including its polarization information, employs two different local oscillators having different optical frequencies (see FIG. 4B). One of the LOs is split into two paths with different phases, but with the same SOP. The other LO is again split into two paths having different phases and the same SOP, but the SOP of the second pair of paths is close to orthogonal to the SOP of the first pair of paths. The Jones vector of the signal can be obtained by using a version of equation 11. If the first pair of paths has SOP $\hat{x}$ and LO optical frequency $\omega_{LOx}$, and the second pair of paths has $\hat{y}$ and $\omega_{LOy}$, then $$E_s(t) = \frac{1}{E^*_{LO}}\begin{pmatrix}e^{-i(\omega_s-\omega_{LOx})t}((\text{beat term }1_x) + i(\text{beat term }2_x))\\ e^{-i(\omega_s-\omega_{LOy})t}((\text{beat term }1_y) + i(\text{beat term }2_y))\end{pmatrix}$$

In this configuration, it is possible to use two different local oscillator frequencies because one frequency is used for each polarization state.

It is possible to use the polarization management features described here without using quadrature sampling. For example homodyne detection can be used with a polarization and phase diversity configuration whose outputs are digitized and processed by a DSP. In this case equations 10, 11 or 13 can be applied with $\omega_s - \omega_{LO} = 0$. Alternatively, conventional heterodyne detection can be used in conjunction with polarization diversity. The use of the DSP provides the same advantage described previously. Specifically, the incoming SOP can effectively be tracked endlessly even though homodyne detection is used, because the DSP is able to apply an arbitrary phase shift.

Recovery of Polarization Multiplexed Signals

The polarization tracking system 131 of FIG. 5 may be utilized to demultiplex two polarization multiplexed signals. Jones vector manipulation within the DSP may be used to emulate the effect of inserting a polarizer in the optical signal path. In general, if the input to a polarizer is $E_s \hat{p}_s$ and the polarizer has maximum transmission state $\hat{p}_{pol}$, then the electric field at the output of the polarizer is $E_s(\hat{p}_s \cdot \hat{p}_{pol}{}^*)\hat{p}_{pol}$, assuming no excess loss. The value of the electric field passing through the polarizer may be derived by using the following variant of equation 10:

$$E_s(t)\hat{p}_s \cdot \hat{p}_{pol}^* = \frac{e^{-i(\omega_s - \omega_{LO})t}}{E_{LO}^*} \begin{pmatrix} (\text{beat term } 1_x) + i(\text{beat term } 2_x) \\ (\text{beat term } 1_y) + i(\text{beat term } 2_y) \end{pmatrix} \cdot \hat{p}_{pol}^* \quad (14)$$

Polarization multiplexing refers to a configuration where two transmitters of similar optical frequency are combined with polarization states that are nearly orthogonal. Polarization multiplexing is advantageous because it doubles the information carried by a WDM channel slot without doubling the spectral bandwidth occupied by the channel. In the situation where channels are launched orthogonal, the condition may be broken when the signals arrive at the receiver because of polarization dependent loss in the transmission link. In the preferred embodiment of the present invention, a polarization demultiplexer function is implemented that does not require the channels to be orthogonal. At the receive end of a conventional transmission system carrying polarization multiplexed signals, the two channels are separated (demultiplexed), usually by a polarizing element that passes one channel and extinguishes the other.

The electric field of the multiplexed channels, A and B, may be written as:

$$\text{Re}[E_{sA}(t) e^{i\omega_{sA} t} \hat{p}_{sA} + E_{sB}(t) e^{i\omega_{sB} t} \hat{p}_{sB}]$$

$\hat{p}_{sA}$ and $\hat{p}_{sB}$ are the Jones unit vectors of the SOPs of A and B. To recover channel A, the signal must be effectively passed through a polarizer oriented to be orthogonal to channel B, that is $\hat{p}_{sB}^\dagger$. Channel A is recovered by applying equation 14:

$$E_{sA}(t) = \frac{e^{-i(\omega_{sA} - \omega_{LO})t}}{E_{LO}^*(\hat{p}_{sA} \cdot \hat{p}_{sB}^{\dagger *})} \begin{pmatrix} (\text{beat term } 1_x) + i(\text{beat term } 2_x) \\ (\text{beat term } 1_y) + i(\text{beat term } 2_y) \end{pmatrix} \cdot \hat{p}_{sB}^{\dagger *} \quad (15)$$

$\hat{p}_{sA} \cdot \hat{p}_{sB}^{\dagger *}$ is nearly 1, given that A and B are close to orthogonal, and can, therefore, be ignored. In a similar manner, to recover channel B, a polarizer $\hat{p}_{sA}^\dagger$ is utilized:

$$E_{sB}(t) = \frac{e^{-i(\omega_{sB} - \omega_{LO})t}}{E_{LO}^*(\hat{p}_{sB} \cdot \hat{p}_{sA}^{\dagger *})} \begin{pmatrix} (\text{beat term } 1_x) + i(\text{beat term } 2_x) \\ (\text{beat term } 1_y) + i(\text{beat term } 2_y) \end{pmatrix} \cdot \hat{p}_{sA}^{\dagger *} \quad (16)$$

The polarization multiplexed channels may be separated even if they are not perfectly orthogonal. They can be separated without the use of any extra hardware. The same polarization diversity tracking system 131 may be employed. To use equations 15 and 16, $\hat{p}_{sA}$ and $\hat{p}_{sB}$ must be known. $\hat{p}_{sA}$ and $\hat{p}_{sB}$ may be determined by an adaptive process which explores all of the polarization space. When the value of $\hat{p}_{sB}$ is close to the correct value, it is possible to recover channel A recognizably. The bit error rate of A may then be used as a metric to obtain the exact value of $\hat{p}_{sB}$. When $\hat{p}_{sA}$ and $\hat{p}_{sB}$ are known correctly, then each signal may be recovered without crosstalk from the other signal. $\hat{p}_{sA}$ and $\hat{p}_{sB}$ must be allowed to track the slow variation in incoming SOPs due to the environmental disturbances experienced by the fiber link. The process of setting the orientation of a real (physical) polarization demultiplexer must also be conducted by trial and error and is relatively slow. The present invention provides the advantage that the iteration speed is determined by the computation time within the DSP, and not by the reaction time of any polarization control hardware.

Obtaining Signals Using Quadrature Sampling by Analog Signal Processing

The present invention, as discussed above, utilizes digital signal processing to obtain the complex envelope of the signal. Referring to the basic (single polarization) apparatus of FIG. 3A, the outputs of the two photodetectors are digitized by the A/D converters 58 and 60, and the mathematics of equations 7 is implemented within the DSP 36 as:

$$\text{Re}[E_s(t)] = \frac{1}{|E_{LO}|} \begin{bmatrix} \cos((\omega_s - \omega_{LO})t - \phi)(\text{beat term } 1) + \\ \sin((\omega_s - \omega_{LO})t - \phi)(\text{beat term } 2) \end{bmatrix} \quad (7a)$$

$$\text{Im}[E_s(t)] = \frac{1}{|E_{LO}|} \begin{bmatrix} -\sin((\omega_s - \omega_{LO})t - \phi)(\text{beat term } 1) + \\ \cos((\omega_s - \omega_{LO})t - \phi)(\text{beat term } 2) \end{bmatrix} \quad (7b)$$

It is advantageous to use a DSP for this task because of the overall flexibility of the DSP and because the complex representation of the signal is then available for further signal processing.

In an alternate embodiment of the present invention, the basic quadrature sampling equations 7 may be implemented using analog signal processing elements. For example, this alternate embodiment may be employed in a scenario where the incoming signal has not been distorted by fiber propagation and the analog components cost less then the DSP components. As with the DSP version, the optical local oscillator may be close to the signal in optical frequency without being phase locked to it.

Figure 6:
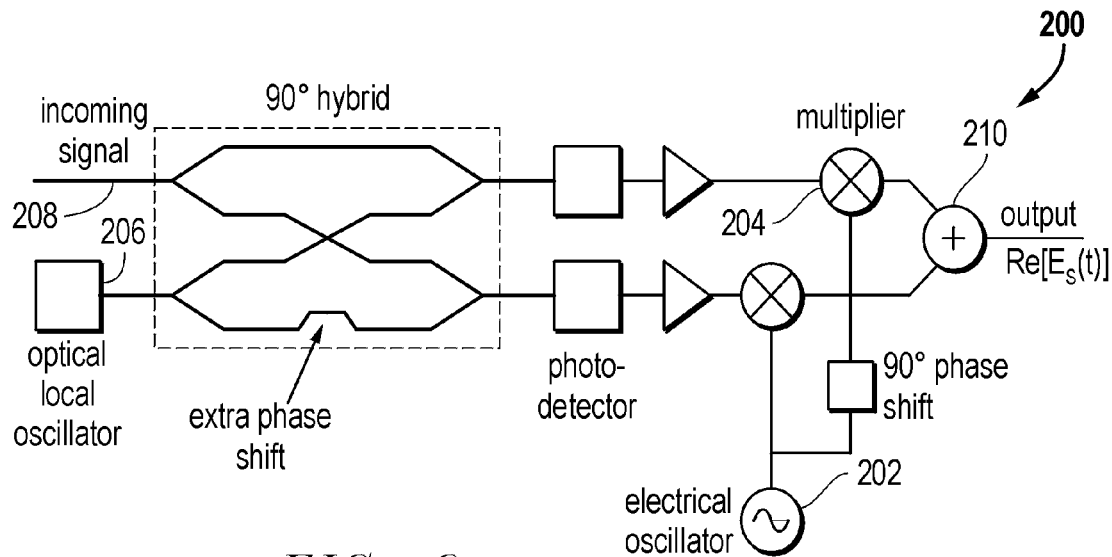
FIG. 6 is a simplified block diagram illustrating quadrature sampling utilizing analog signal processing in a first alternate embodiment of the present invention.

FIG. 6 is a simplified block diagram illustrating quadrature sampling utilizing analog signal processing in a first alternate embodiment of the present invention. This configuration can be used to detect a BPSK encoded signal, where only the real part of the envelope of the electric field has to be recovered. An electrical oscillator 202 is split with one part undergoing a 90° phase shift, so as to generate sine and cosine signals. An analog multiplier 204 component may be a double balanced mixer. The summer component 210 performs the summation in the right hand side of equation 7a, and so produces an output representative of the real part of the envelope of the electric field of the incoming signal. The electrical oscillator must be phase locked to the difference frequency between the optical signal 208 and optical local oscillator 206 so as to generate an output at a baseband. The circuitry to achieve phase locking is not shown, but it may be done by the Costas loop described in Norimatsu, for example.

This apparatus is similar to the double stage phase diversity scheme disclosed by Okoshi. It is different in that the electrical oscillator frequency is equal to the difference frequency between the signal and LO so as to generate an output at baseband. With double stage phase diversity detection (DSPD), the electrical oscillator frequency is higher than the difference frequency, and the output of the summation is a virtual IF signal which requires another demodulation stage to be converted to baseband.

Compensation of Impairments by DSP

The quadrature sampling process provides a complete representation of the optical signal (i.e., amplitude, phase, and state of polarization). All other parameters may be derived from this basic information. With this complete representation of the signal, the result can be calculated for any deterministic physical process that happens in the transmission optical fiber or the terminal electronics, provided the calculation is within the computation ability of the DSP. Any deterministic impairment can be reversed by a calculation within the DSP. The term "deterministic process" does not include the addition of noise, or the subtraction of added noise. It is not possible to fully reverse all impairments using an equalizer (DSP or ASP) after direct detection, although such an equalizer can improve the signal. The result of the direct detection operation is $|E_s(t)|^2$, and the phase and polarization information has been discarded.

Some of the fiber propagation impairments affecting a single WDM channel that can be corrected are chromatic dispersion (CD), polarization mode dispersion (PMD), multipath interference (MPI), and self phase modulation (SPM). To apply a correction for a particular impairment, a mathematical description of the distortion must be determined. Next, a mathematical formula for the inverse to the impairment must be derived. The established methods of DSP are utilized to convert the inverse function into an algorithm that can be implemented in the digital signal processor.

Oftentimes, although the behavior of the impairment is completely understood, there may be one or more parameters that are not known. For example, to compensate for the chromatic dispersion of a section of optical fiber, the length of the fiber must be known. In such cases, the missing parameter can be set adaptively based on the metric of lowest bit error rate.

Any of the digital signal processing operations described here can also be applied if the coherent detection subsystem does not employ quadrature sampling, i.e., if it uses homodyne or conventional heterodyne detection followed by A/D conversion.

Chromatic Dispersion

For chromatic dispersion (CD) on an optical signal, the CD of a section of fiber is described by the $2^{nd}$ order group delay coefficient $\beta_2$ and the fiber length L. This is disclosed in "Nonlinear fiber optics" by G. Agrawal (Agrawal 1). If the electric field envelope at the input to the fiber is $E_{in}(t)$, then the Fourier transform is denoted by $\tilde{E}_{in}(\omega)$, and similarly for the output field $E_{out}(t)$. Ignoring the effect of fiber loss, the impact of chromatic dispersion alone is:

$$\tilde{E}_{out}(\omega) = \tilde{E}_{in}(\omega) e^{i\frac{1}{2}\beta_2\omega^2 L}$$

Inverting this relationship results in:

$$\tilde{E}_{in}(\omega) = \tilde{E}_{out}(\omega) e^{-i\frac{1}{2}\beta_2\omega^2 L} \quad (17)$$

Equation 17 deals with the Fourier transform of the signal, i.e. it expresses a linear filter relationship. Denoting the filter function by $\tilde{f}(\omega)$ $$\tilde{f}(\omega) = e^{-i\frac{1}{2}\beta_2\omega^2 L}$$

and its inverse Fourier transform $f(t)$ can be calculated. Then:

$$E_{in}(t) = E_{out}(t) \otimes f(t) \quad (18)$$

($\otimes$ denotes the convolution operation.) Equation 18 may be applied by the DSP, and, in principle, compensates perfectly for the chromatic dispersion of the fiber section. The DSP can convolve only a finite length vector $f(t)$, and so it has to be truncated according to the computation ability of the DSP. $f(t)$ takes the form of a resonance with high magnitude points close to t=0, so the truncation should not lead to a large error. If $\beta_2 L$ of the link is not known, it can be found adaptively, such as by updating the vector $f(t)$ by trial and error to obtain the best result.

Polarization Mode Dispersion

Referencing polarization mode dispersion, it is disclosed in "Systems considerations for polarization-mode dispersions" by F. P. Kapron (Kapron), an optical component has polarization mode dispersion (PMD) if light travels faster in one SOP (the fast axis) than in the orthogonal SOP (the slow axis). A long section of optical fiber usually exhibits strong mode coupling behavior, which means that the orientation of the fast and slow axes varies with distance. In this situation, the PMD varies with time due to small changes in the environmental conditions of the fiber. The PMD in the strong mode coupling regime, at any point in time, is described by a pair of mutually orthogonal principal SOPs, a first order coefficient and a second order coefficient.

Oftentimes, most of the system penalty comes from first order PMD. If the input to a section of fiber is $E_{in}(t)\hat{p}_{in}$ (constant in SOP with time), the output is $E_{out}(t)$ (not necessarily having constant SOP with time). In addition, the principal states have Jones vectors $\hat{p}_{PMD}$ and $\hat{p}_{PMD}{}^\dagger$, and the first order PMD is $\tau$, then ignoring the SOP transformation of the fiber section and ignoring the fiber loss, the impact of the first order PMD is:

$$E_{out}(t) = E_{in}(t)(\hat{p}_{in} \cdot \hat{p}_{PMD}{}^*)\hat{p}_{PMD} + E_{in}(t-\tau)(\hat{p}_{in} \cdot \hat{p}_{PMD}{}^{\dagger*})\hat{p}_{PMD}{}^\dagger \quad (19)$$

Equation 19 indicates that the signal is separated in two according to how much of the signal lies in the two principal states and one state is retarded in time by $\tau$ while the other is left alone. Equation 19 is reversed by:

$$E_{in}(t) = E_{out}(t) \cdot \hat{p}_{PMD}{}^* (\hat{p}_{in} \cdot \hat{p}_{PMD}{}^*) + E_{out}(t+\tau) \cdot \hat{p}_{PMD}{}^\dagger (\hat{p}_{in} \cdot \hat{p}_{PMD}{}^{\dagger*}) \quad (20)$$

This relationship may be implemented by the DSP so as to compensate for the first order PMD. $\tau$ is typically not a whole multiple of the sampling interval of the A/D. Therefore, it is necessary to perform interpolation to obtain both $E_{out}(t)$ and $E_{out}(t+\tau)$. $\hat{p}_{PMD}$ and $\tau$ are not known initially to the DSP and must be found adaptively. These values vary with time and, therefore, the DSP must track the real values.

PMD is one of the impairments that can be partially compensated by electrical equalization in conjunction with direct detection. The method discussed above, however, in principle completely reverses the effect of PMD in this situation.

Multipath Interference

Figure 7A:
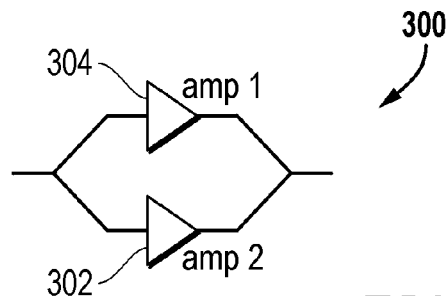
FIG. 7A is a simplified block diagram illustrating a subsystem that contributes MPI containing a pair of optical amplifiers connected in parallel.
Figure 7B:
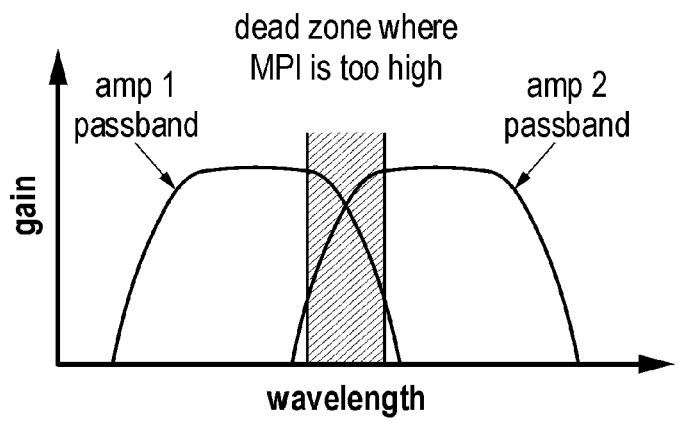
FIG. 7B is a graphical representation of an associated gain spectrum for FIG. 7A.

Multipath interference occurs when an optical signal is split into two or more paths having different physical lengths and then recombined. Usually one path (i.e., the main path)

carries a much stronger signal than the others, but the power in the "echoes" arriving via the other path degrades the signal that has traveled through the main path. FIG. 7A is a simplified block diagram illustrating a subsystem 300 that contributes MPI, containing a pair of optical amplifiers 302 and 304 connected in parallel. The two optical amplifiers have different passbands. FIG. 7B is a graphical representation of an associated gain spectrum for FIG. 7A. The configuration in FIG. 7A is used to produce amplification over an extended optical bandwidth. However, it is not possible to operate over a continuous bandwidth because there is an unusable region in between the two passbands where the MPI is too great. At a wavelength in the dead zone, typically one amplifier has more gain, called $G_1$, but the gain of the other amplifier, $G_2$, is sufficiently large that MPI is a problem. The impact of this situation of two path MPI on the signal electric field is (ignoring the effect of the optical polarization):

$$E_{out}(t) = \sqrt{G_1} E_{in}(t) + \sqrt{G_2} e^{-i\omega_s \tau_{MPI}} E_{in}(t - \tau_{MPI}) \quad (21)$$

where $\tau_{MPI}$ is the difference in time delay of the two paths.

To compensate for the MPI within the DSP, the relationship of equation 21 must be inverted. The easiest way to accomplish this inversion is in the z-transform domain. The z-transform of equation 21 is:

$$E_{out}(z) = \left( \sqrt{G_1} + \sqrt{G_2}\, e^{-i\omega_s \tau_{MPI}} z^{-\frac{\tau_{MPI}}{\tau_{samp}}} \right) E_{in}(z)$$

where $\tau_{samp}$ is the sampling interval of the A/D converter and it is assumed that $\tau_{MPI}$ is a whole multiple of $\tau_{samp}$. The MPI impairment is reversed by:

$$E_{in}(z) = \frac{1}{\sqrt{G_1} + \sqrt{G_2}\, e^{-i\omega_s \tau_{MPI}} z^{-\frac{\tau_{MPI}}{\tau_{samp}}}} E_{out}(z) \quad (22)$$

MPI compensation can be achieved by implementing a digital filter within the DSP. As explained in Lyons, the output y(n) of a general recursive digital filter is computed from the input x(n) by:

$$y(n) = \sum_{k=0}^{\infty} a_k x(n-k) + \sum_{k=0}^{\infty} b_k y(n-k)$$

The transfer function of equation 22 may be obtained from a digital filter using these coefficients:

$$a_0 = \frac{1}{\sqrt{G_1}}$$

$$a_k = 0 \quad\quad\quad k > 0$$

$$b_k = -\sqrt{\frac{G_2}{G_1}}\, e^{-i\omega_s \tau} MPI \quad k = \frac{\tau_{MPI}}{\tau_{samp}}$$

$$b_k = 0 \quad\quad\quad \text{otherwise}$$

$\tau_{MPI}$ and $G_2/G_1$ can be found adaptively by the DSP given that they are not known initially.

The above example provides compensation of a two path MPI. It is possible to compensate for more paths by adding more terms to the recursive filter algorithm, though for a large number of MPI paths it is computationally difficult to implement.

Adaptive Equalization

In addition to compensating for known physical impairments, the DSP may improve the signal without determining the cause of the distortion. Adaptive equalization is used in radio transmission systems, and similar algorithms may also be used after coherent optical detection (See Proakis, chapters 10 and 11). Each equalizer type relies on a set of parameters to customize its function. These parameters may be determined during normal operation based on a metric of the quality of the received signal, or during a training phase when a known sequence is sent through the system. The least mean squares algorithm is often applied as the control algorithm to obtain the parameter set. Examples of adaptive equalization methods are feedforward equalization-decision feedback equalization and maximum likelihood sequence estimation.

Optical Filter Control

When coherent detection is used, it is equivalent to inserting a narrow optical filter centered around the local oscillator wavelength. The passband shape of the filter is symmetric, and is given by unfolding around ω=0 the baseband response of the detector+amplifier chain+other components prior to the decision circuit (in the present invention, the A/D converter+DSP). Within the preferred embodiment of the present invention, the effective filter shape may be tailored within the DSP. An adaptive filter may be incorporated in the DSP first to undo any unwanted features in the frequency response of the detector etc.

The ability to create an arbitrary filter shape is advantageous in optical signal transmissions. Much attention is paid to the shape of the WDM demux filter in dense WDM system design. The filter must have a flat amplitude response and a low group delay ripple within the spectral window occupied by the signal, and steep walls outside the window to reject neighboring channels. There are also applications where the optical filter shape is engineered to improve the bit error rate of the signal passing through it, such as to improve the tolerance to SPM of an NRZ signal [see "Interplay of Fiber Non-Linearity and Optical Filtering in Ultra-Dense WDM" by I. Lyubomirsky et al. (Lyubomirsky)] and to reject one of the sidebands of an NRZ signal [see "0.8 bit/s Hz of Information Spectral Density by Vestigial Sideband Filtering of 42.66 Gb/s NRZ by W. Idler et al. (Idler)]. In addition, the filter shape may be set to be different for different signal types (e.g., wide for high symbol rate signals, and having steep skirts for dense WDM signals).

For example, assume that the desired filter shape is $\tilde{f}(\omega - \omega_{LO})$. The filter shape does not have to be symmetric about $\omega - \omega_{LO} = 0$, as it would if an analog signal processing stage were used. The constraint does not apply because the DSP is processing complex electric field values. Assuming that the detector+amp chain effectively has a flat frequency response, the optical filter is implemented by:

$$E_{s,filt}(t) = E_s(t) \otimes f(t)$$

where $f(t)$ is the inverse Fourier transform of $\tilde{f}(\omega)$.

Subtraction of Signal Power Term when Using Single Ended Detection

Recalling that the optical power in one arm of a coherent detection apparatus is given by equation 1:

$$P_1 = |E_s(t)|^2 + |E_{LO}|^2 + 2\text{Re}[E_s(t)E_{LO}^* e^{i(\omega_s - \omega_{LO})t}] \quad (1)$$

The local oscillator power $|E_{LO}|^2$ is constant, so the detected power is equal to the beat term only if the local oscillator power is considerably larger than the signal power. Differential detection allows the $|E_s(t)|^2$ term to be subtracted. However, it is preferred to utilize single ended detection because it saves the cost of a second photodetector.

It is possible to deduce $E_s(t)$ from the two phase diverse arms of a quadrature sampling receiver, even if the LO power is not much larger than the signal power. A first estimate of the signal envelope $E_{s\,est1}(t)$ is made using the method for quadrature sampling described above. This first estimate will be related to the true value $E_s(t)$ as follows $$E_{s\,est1}(t) = E_s(t) + |E_s(t)|^2 \frac{1+i}{2E_{LO}^*} e^{-i(\omega_s - \omega_{LO})t} \quad (23)$$

The proportional deviation of $E_{s\,est1}(t)$ from $E_s(t)$ (the second term in equation 23) has magnitude $$\frac{|E_s(t)|}{\sqrt{2}\,|E_{LO}|}.$$

Then a second estimate can be made as follows:

$$E_{s\,est2}(t) = E_{s\,est1}(t) - |E_{s\,est1}(t)|^2 \frac{1+i}{2E_{LO}^*} e^{-i(\omega_s - \omega_{LO})t} \quad (24)$$

$E_{s\,est2}$ is closer to $E_s$ than $E_{s\,est1}$ provided that the power of the LO is greater than that of the signal. In actuality, $E_{s\,est2}$ is related to $E_s$ by:

$$E_{s\,est2}(t) = E_s(t) - \frac{E_s(t)|E_s(t)|^2}{2|E_{LO}|^2} -$$
$$\frac{iE_s^*(t)|E_s(t)|^2}{2E_{LO}^{*2}} e^{-i2(\omega_s - \omega_{LO})t} - \frac{(1+i)|E_s(t)|^4}{4E_{LO}^{*2}|E_{LO}|^2} e^{-i(\omega_s - \omega_{LO})t}$$

The proportional deviation of $E_{s\,est2}(t)$ from $E_s(t)$ now has magnitude $$\frac{|E_s(t)|^2}{|E_{LO}|^2},$$

which is smaller than it was for $E_{s\,est1}$. Repeated iterations of equation 24 yield an estimate of $E_s$ that is closer to the actual value.

Comparison with Prior Art on Impairment Compensation

Electronic compensation for chromatic dispersion has been demonstrated with heterodyne coherent detection, as disclosed in "Chromatic dispersion compensation in coherent optical communications" by K. Iwashita et al. (Iwashita). The compensation is done by inserting an analog signal processing component in the IF path which has the correct group delay vs. frequency curve in the IF band to reverse the group delay vs. frequency the signal experienced in the optical band. Additionally, the double stage phase diversity method described above generates a virtual IF signal from baseband inphase and quadrature signals, and chromatic dispersion can be compensated by ASP in the IF band in the same way as for standard heterodyne detection (see Okoshi). This proposal has the advantage that a low bandwidth detector can be used, as for homodyne detection, but it has the disadvantage that the following components need to work at high IF frequencies. K. Yonenaga in "Dispersion compensation for homodyne detection systems using a 10-Gb/s optical PSK-VSB signal" (Yonenaga) discloses compensating for CD after homodyne detection, but disclosed using a vestigial sideband (VSB) modulation format. However, VSB formats require extra complexity in the transmitter and suffer from the disadvantage of having a worse sensitivity than standard modulation.

The present invention has many advantages over existing ASP processes for impairment compensation. The present invention, unlike existing ASP systems, works with homodyne as well as heterodyne detection. There is no requirement to utilize components that work at frequencies higher than the symbol rate, the amount of chromatic dispersion can be varied under software control, and other impairments can be compensated which do not have a response that can be engineered into an ASP component.

Crosstalk Subtraction

The discussion above dealt with signal processing of a single WDM channel. However, there are impairments in a WDM transmission system that are driven by other WDM channels, such as linear crosstalk (WDM demux crosstalk), cross phase modulation (XPM) and four wave mixing (FWM). A WDM channel suffers from crosstalk if the quality of the received signal (measured by the BER in the case of a digital signal) is worse in the case when other WDM channels are present than when they are absent. The present invention can overcome these impairments.

To adequately subtract any crosstalk from a signal, the main channel and the other WDM channels that contribute to the impairment are observed by sampled coherent detection. An initial estimate of the complex envelope of all the channels taking part in the crosstalk process is obtained. If necessary, an optical filter may be applied. A mathematical description of the crosstalk process is applied to calculate the crosstalk on the main channel. Next, the crosstalk is subtracted or reversed from the main channel.

A coherent receiver only sees a region of the optical spectrum about 2× the receiver bandwidth, centered on the local oscillator wavelength. To make observations of many WDM channels simultaneously, it is necessary either to use a coherent receiver with sufficiently wide bandwidth to observe several WDM channels at once, or to use several sampled coherent receivers with different local oscillator wavelengths and combine the sampled description of many channels in one digital signal processor. The requirement on high speed digital data transfer and on computation ability of a DSP grows rapidly as it is asked to process more WDM channels. However, any impairment may be reversed with complete knowledge of the entire received spectrum.

To detect two channels, centered on $\omega_{sA}$ and $\omega_{sB}$, using the same receiver, equation 6 is used with different signal center frequencies and a filter function $\tilde{f}(\omega)$ (having inverse Fourier transform $f(t)$) is applied to remove the other channel as shown below:

$$E_{sA}(t) = \left(\frac{e^{-i(\omega_{sA}-\omega_{LO})t}}{E_{LO}^*}[(\text{beat term 1}) + i(\text{beat term 2})]\right) \otimes f(t) \quad (25a)$$

$$E_{sB}(t) = \left(\frac{e^{-i(\omega_{sB}-\omega_{LO})t}}{E_{LO}^*}[(\text{beat term 1}) + i(\text{beat term 2})]\right) \otimes f(t) \quad (25b)$$

Linear Crosstalk Subtraction

The spectrum of an optical signal modulated by high bit rate information has a finite width. The 3 dB width is at least a value equal to the symbol rate. In addition, the spectrum typically has "skirts" which fall off at a finite rate moving away from the center of the channel. In general, to separate two closely spaced WDM channels, a narrow optical filter is required which has steep walls. The DSP technology in conjunction with quadrature sampled coherent detection is able to synthesize an arbitrarily steep walled filter. However, if the channels are spaced too closely, then they will overlap. No matter what optical filter passband shape is chosen, if it passes one channel without distorting it, then it will also admit some energy from the adjacent channel. The crosstalk in this scenario is known as linear crosstalk, and the situation can be improved by using crosstalk subtraction.

For two WDM channels, A and B, in the presence of additive noise from optical amplifiers n(t), the signal electric field (ignoring SOP) arriving at the receiver can be written as:

$$\text{Re}[E_A(t)e^{i\omega_A t} + E_B(t)e^{i\omega_B t} + n(t)]$$

A first estimate of each of the channels may be made using quadrature sampling, either in one receiver or in two separate receivers with different LOs, and applying a narrow filter having impulse response $f(t)$, per equations 25. The estimates will each contain crosstalk from the other channel.

$$E_{A\,est1}(t) = \quad (26a)$$
$$E_A(t) \otimes f(t) + \left(n(t)e^{-i\omega_A t}\right) \otimes f(t) + \left(E_B(t)e^{i(\omega_B-\omega_A)t}\right) \otimes f(t)$$

$$E_{B\,est1}(t) = \quad (26b)$$
$$E_B(t) \otimes f(t) + \left(n(t)e^{-i\omega_B t}\right) \otimes f(t) + \left(E_A(t)e^{i(\omega_A-\omega_B)t}\right) \otimes f(t)$$

The first term of the right hand side of equations 26a and 26b is the filtered version of the desired signal, the second term is noise, and the third term is crosstalk. The presence of crosstalk means that the bit error rate will be higher than it would be if the other channel were not there. The two estimates can be passed to a decision function, denoted by Q( . . . ), which predicts which of the allowed values was transmitted. The quantized value of each channel, $Q(E_{est\,A})$ or $Q(E_{est\,B})$, can then be subtracted from the other channel to make a second estimate:

$$E_{A\,est2}(t) = E_{A\,est1}(t) - \left(Q(E_{B\,est1}(t))e^{i(\omega_B-\omega_A)t}\right) \otimes f(t) \quad (27a)$$

$$E_{B\,est2}(t) = E_{B\,est1}(t) - \left(Q(E_{A\,est1}(t))e^{i(\omega_A-\omega_B)t}\right) \otimes f(t) \quad (27b)$$

This second estimate will generally be better than the first.

The accuracy of $E_{A\,est2}$, which uses crosstalk subtraction, can be compared with $E_{A\,est1}$ which does not utilize crosstalk subtraction. Substituting equations 26 into 27a provides:

$$E_{A\,est2}(t) = E_A(t) \otimes f(t) + \left(n(t)e^{-i\omega_A t}\right) \otimes f(t) + \quad (28)$$
$$\left((E_B(t) - Q(E_{B\,est1}(t)))e^{i(\omega_B-\omega_A)t}\right) \otimes f(t)$$

The function $E_B(t) - Q(E_{B\,est1}(t))$ is zero most of the time, and has a pulse whenever a bit error occurs based on $E_{B\,est1}$. The noise term in equations 28 and 26a cannot be avoided, and in fact it is the target to make the system noise limited. Comparing equation 28 with 26a, $E_{A\,est2}$ is closer than $E_{A\,est1}$ to $E_A(t) \otimes f(t)$ provided that $E_B - Q(E_{B\,est1})$ has a lower root mean square (r.m.s.) deviation than $E_{B\,est1}$. This is correct when the BER of $E_{B\,est1}$ is lower than about 0.5. The channels should be spaced less than approximately the symbol rate before this condition is violated, so linear crosstalk subtraction enables a very low channel spacing to be achieved.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

APPENDIX A

Use of Complex Numbers to Describe Modulated Signals

The discussion above utilizes complex numbers to describe sine and cosine functions because this notation is a compact way of including the phase of the sine wave or cosine wave. For example the electric field is written in the form:

$$E(t) = Re[E_s e^{i\omega t}] \quad (A1)$$

where $E_s$ is a complex number. This can be expressed in terms of sines and cosines as:

$$E(t) = Re\lfloor E_s \rfloor \cos(\omega t) - Im\lfloor E_s \rfloor \sin(\omega t)$$

Or if complex $E_s$ is written in terms of its magnitude and phase as:

$$E_s = |E_s|e^{i\theta_s}$$

then A1 becomes:

$$E(t) = |E_s|\cos(\omega t + \theta_s)$$

The complex number notation is compact because the phase of the sine wave is stored in the phase of the complex number.

In some places in the discussion, there appear equations like:

$$\text{beat term} = Re[E_s E_{LO}^* e^{i\omega t}] \quad (A2)$$

$E_{LO}^*$ is the complex conjugate of $E_{LO}$, meaning that every occurrence of i is replaced with −i, and:

$$E_{LO}^* = |E_{LO}|e^{-i\theta_{LO}}$$

So A2 can be rewritten as:

$$\text{beat term} = |E_s||E_{LO}|\cos(\omega t + \theta_s - \theta_{LO})$$

The appearance of $E_s E_{LO}^*$ in A2 means to take the phase difference between $E_s$ and $E_{LO}$.

The power of an optical wave is given by the magnitude squared of the complex electric field, and does not have a sinusoid time dependence. In the case of a field given by A1:

$$\text{power} = (E_s e^{i\omega t})^*(E_s e^{i\omega t}) = |E_s|^2$$

Jones Vectors

The state of polarization of an optical signal can be described by a Jones vector. This is a two element column vector. Each element is the complex envelope of the electric field, i.e. phase information included. The top element is the component of the field in the x-direction (horizontal) and the bottom element in the y-direction (vertical). In fact x and y can be an arbitrary pair of orthogonal directions. [See "Optics" by E. Hecht "Hecht"].

Some Jones vectors of familiar states of polarization are listed below.

$$\begin{pmatrix} 1 \\ 0 \end{pmatrix} \quad \text{horizontal}$$

$$\begin{pmatrix} 0 \\ 1 \end{pmatrix} \quad \text{vertical}$$

$$\frac{1}{\sqrt{2}}\begin{pmatrix} 1 \\ 1 \end{pmatrix} \quad \text{linearly polarized at } 45°$$

$$\frac{1}{\sqrt{2}}\begin{pmatrix} 1 \\ i \end{pmatrix} \quad \text{circular}$$

A Jones unit vector $\hat{p}$ has the property that is:

$$\hat{p} \cdot \hat{p} = 1$$

If light polarized in SOP $\hat{p}_1$ passes through a polarizer oriented in direction $\hat{p}_2$, then the electric field is scaled by $\hat{p}_1 \cdot \hat{p}_2^*$. In general $0 \leq |\hat{p}_1 \cdot \hat{p}_2^*| \leq 1$. The Jones unit vector of the state orthogonal to $\hat{p}$ is denoted in the above discussion by $\hat{p}^\dagger$, and $$\hat{p} \cdot \hat{p}^{\dagger *} = 0$$

if $$\hat{p} = \begin{pmatrix} \hat{p}_x \\ \hat{p}_y \end{pmatrix}$$

then $$\hat{p}^\dagger = \begin{pmatrix} \left|\frac{\hat{p}_y}{\hat{p}_x}\right| \hat{p}_x \\ -\left|\frac{\hat{p}_x}{\hat{p}_y}\right| \hat{p}_y \end{pmatrix}$$

REFERENCES

Agazzi: O. Agazzi, V. Gopinathan, K. Parhi, K. Kota, A. Phanse, "DSP-Based Equalization for Optical Channels—Feasibility of VLSI Imple-mentation," IEEE 802.3ae 10 Gb/s, vol. September 2000 Interim meeting, New Orleans, La., USA, p. http://www.ieee802.org/3/ae/public/sep00/, Sep. 12-14, 2000.

Agrawal1: Govind P. Agrawal, "Nonlinear fiber optics," Academic Press, 2nd ed., 1995.

Agrawal2: Govind P. Agrawal, "Fiber-optic communication systems," Wiley, 2nd ed., 1997.

Brain: M. C. Brain, M. J. Creaner, R. C. Steele, N. G. Walker, G. R. Walker, J. Mellis, S. Al-Chalabi, J. Davidson, M. Rutherford, I. C. Sturgess, "Progress towards the field deployment of coherent optical fiber systems," IEEE J. Lightwave Technol., vol. 8, no. 3, p. 423-437, 1990.

Bulow1: H. Bulow, G. Thielecke, "Electronic PMD mitigation-from linear equalization to maximum-likelihood detection," OFC 2001 conference, Anaheim, US, paper WAA3, 2001.

Bulow2: H. Bulow, "Electronic equalization of transmission impairments," OFC 2002 conference, Anaheim, US, paper TuE4, 2002.

Enning: B. Enning, R. S. Vodhanel, E. Dietrich, P. Patzak, P. Meissner, G. Wenke, "Signal processing in an optical polarization diversity for 560-Mbit/s ASK heterodyne detection," IEEE J. Lightwave Technol., vol. 7, no. 3.

Gowar: John Gowar, "Optical Communication Systems," Prentice Hall, 2nd ed., 1993.

Habbab: I. M. I. Habbab, L. J. Cimini, "Polarization switching techniques for coherent optical communications," IEEE J. Lightwave Technol., vol. 6, no. 10, p. 1537-1548, 1988.

Haunstein: H. F. Haunstein, K. Sticht, A. Dittrich, W. Sauer-Greff, R. Urbansky, "Design of near optimum electrical equalizers for optical transmission in the presence of PMD," OFC 2001 conference, Anaheim, US, paper WAA4, 2001. Hecht: Eugene Hecht, "Optics," Addison-Wesley, 4th ed., 2001.

Idler: W. Idler, G. Charlet, R. Dischler, Y. Frignac, S. Bigo, "0.8 bit/s/Hz of Information Spectral Density by Vestigial Sideband Filtering of 42.66 Gb/s NRZ," ECOC 2002 conference, Copenhagen, Denmark, paper 8.1.5, 2002.

Iwashita: K. Iwashita, N. Takachio, "Chromatic dispersion compensation in coherent optical communications," IEEE J. Lightwave Technol., vol. 8, no. 3, p. 367-375, 1990.

Kahn: J. M. Kahn, I. M. I. Habbab, C. R. Giles, "1 Gbit/s zero-IF DPSK coherent optical system using a single photodetector," IEE Electron. Lett., vol. 24, no. 23, p. 1455-1457, 1988.

Kapron: F. P. Kapron, "Systems considerations for polarization-mode dispersion," NFOEC '97 conference, p. 433-444, 1997.

Kazovsky1: L. G. Kazovsky, "Phase- and polarization-diversity coherent optical techniques," IEEE J. Lightwave Technol., vol. 7, no. 7, p. 279-292, 1989.

Kazovsky2: L. G. Kazovsky, R. Welter, A. F. Elrafaie, W. Sessa, "Wide-linewidth phase diversity homodyne receivers," IEEE J. Lightwave Technol., vol. 6, no. 10, p. 1527-1536, 1988.

Lyons: Richard G. Lyons, "Understanding Digital Signal Processing," Prentice Hall, 1996.

Lyubomirsky: I. Lyubomirsky, T. Qiu, J. Roman, M. Nayfeh, M. Frankel, M. G. Taylor, "Interplay of Fiber Non-Linearity and Optical Filtering in Ultra-Dense WDM," ECOC 2002 conference, Copenhagen, Denmark, paper P3.16, 2002.

Matsuda: T. Matsuda, A. Naka, S. Saito, "Comparison between NRZ and RZ signal formats for in-line amplifier transmission in the zero-dispersion regime," IEEE J. Lightwave Technol., vol. 16, no. 3, p. 340-348, 1998.

Miyamoto: Y. Miyamoto, K. Yonenaga, A. Hirano, H. Toba, K. Murata, H. Miyazawa, "100 GHz-spaced 8×43 Gbit/s DWDM unrepeatered transmission over 163 km using duobinary-carrier-suppressed return-to-zero format," IEE Electron. Lett., vol. 37, no. 23, p. 1395-1396, 2001.

Noe: R. Noe, H. J. Rodler, A. Ebberg, G. Gaukel, B. Noll, J. Wittman, F. Auracher, "Comparison of polarization handling methods in coherent optical systems," IEEE J. Lightwave Technol., vol. 9, no. 10, p. 1353-1366, 1991.

Norimatsu: S. Norimatsu, K. Iwashita, "Linewidth requirements for optical synchronous detection systems with non-negligible loop delay time," IEEE J. Lightwave Technol., vol. 10, no. 3, p. 349-341, 1992.

Okoshi: T. Okoshi, S. Yamashita, "Double-stage phase-diversity optical receiver: Analysis and experimental confirmation of the principle," IEEE J. Lightwave Technol., vol. 8, no. 3, p. 376-384, 1990.

Penninckx: D. Penninckx, M. Chbat, L. Pierre, J. -P. Thiery, "The phase-shaped binary transmission (PSBT): a new technique to transmit far beyond the chromatic dispersion limit," IEEE Phot. Tech. Lett., vol. 9, no. 2, p. 259-261, 1997.

Poirrier: J. Poirrier, F. Buchali, H. Bulow, "Electronic WDM crosstalk cancellation," ECOC 2001 conference, Amsterdam, Netherlands, p. 94-95, 2001.

Proakis: John G. Proakis, "Digital Communications," McGraw-Hill, 4th ed., 2000.

Tsushima: H. Tsushima, "Homodyne optical receiver equipment," U.S. Pat. No. 5,323,258, 1994.

Yonenaga: K. Yonenaga, S. Norimatsu, "Dispersion compensation for homodyne detection systems using a 10-Gb/s optical PSK-VSB signal," IEEE Phot. Tech. Lett., vol. 7, no. 8, p. 929-590, 1995.

What is claimed is:

1. A coherent optical detection system receiving an incoming optical signal in a fiber optics network, said system comprising:
    two local oscillators, each local oscillator emitting light;
    an optical mixing hybrid for generating at least four optical waves similar to the incoming optical signal and two optical waves similar to light from each of the local oscillators, said optical mixing hybrid combining the optical waves similar to the incoming optical signal and the optical waves similar to the local oscillator light into at least four outputs and wherein said local oscillators do not have to be phase locked to the incoming optical signal;
    four photodetectors communicating with the optical mixing hybrid, wherein said four photodetectors receive optical signals from four of the at least four outputs;
    four A/D converters to receive electrical signals from the four photodetectors, said four A/D converters digitizing the received electrical signals; and
    a digital signal processor for performing computations on digital values from the four A/D converters to obtain information carried by the incoming optical signal without limitation to the state of polarization of the incoming optical signal.

2. The coherent optical detection system of claim 1 wherein:
    the first and second outputs of the four selected outputs of the optical mixing hybrid each carry an optical wave similar to the incoming optical signal and an optical wave similar to light from the first local oscillator, and the third and fourth outputs of the four selected outputs of the optical mixing hybrid each carry an optical wave similar to the incoming optical signal and an optical wave similar to light from the second local oscillator; and
    the beat product observed upon photodetection of the first output is substantially the same as the beat product that would be observed by mixing the original incoming optical signal with light from the first local oscillator of a certain first state of polarization, and the beat product observed upon photodetection of the second output is substantially the same as the beat product that would be observed by mixing the original incoming optical signal with light from the first local oscillator of the same first state of polarization but having a different phase; and
    the beat product observed upon photodetection of the third output is substantially the same as the beat product that would be observed by mixing the original incoming optical signal with light from the second local oscillator of a certain second state of polarization, and the beat product observed upon photodetection of the fourth output is substantially the same as the beat product that would be observed by mixing the original incoming optical signal with light from the second local oscillator of the same second state of polarization but having a different phase; and
    the first state of polarization is close to orthogonal to the second state of polarization.

3. The coherent optical detection system of claim 1 wherein:
    the first and second outputs of the four selected outputs of the optical mixing hybrid each carry an optical wave similar to the incoming optical signal and an optical wave similar to light from the first local oscillator, and the third and fourth outputs of the four selected outputs of the optical mixing hybrid each carry an optical wave similar to the incoming optical signal and an optical wave similar to light from the second local oscillator; and
    the beat product observed upon photodetection of the first output is substantially the same as the beat product that would be observed by mixing the original incoming optical signal with light from the first local oscillator of a certain first state of polarization, and the beat product observed upon photodetection of the second output is substantially the same as the beat product that would be observed by mixing the original incoming optical signal with light from the first local oscillator of the same first state of polarization but having a different phase; and
    the beat product observed upon photodetection of the third output is substantially the same as the beat product that would be observed by mixing the original incoming optical signal with light from the second local oscillator of a certain second state of polarization, and the beat product observed upon photodetection of the fourth output is substantially the same as the beat product that would be observed by mixing the original incoming optical signal with light form the second local oscillator of the same second state of polarization but having a different phase; and the first state of polarization is different from but not orthogonal to the second state of polarization.

4. The coherent optical detection system of claim 1 wherein:
the digital values from the four A/D converters arriving at the digital signal processor at the same time do not correspond to samples taken at the same time with respect to the envelope of the electric field of the incoming optical signal; and
the computations performed by the digital signal processor take into account the different sample times of the A/D converters.

5. The coherent optical detection system of claim 1 wherein the digital signal processor obtains a Jones vector representation or equivalent representation that includes the amplitude, phase and polarization of the incoming optical signal.

6. The coherent optical detection system of claim 5 wherein:
the incoming optical signal includes a first optical channel and a second optical channel being combined so that the first optical channel has a state of polarization close to orthogonal to the second optical channel; and
the digital signal processor performs computations to obtain information carried by each of the two polarization multiplexed channels in the incoming optical signal independent of the other channel.

7. The coherent optical detection system of claim 5 wherein:
the incoming optical signal includes a first optical channel and a second optical channel being combined so that the first optical channel arriving at the coherent optical detection system has a state of polarization which is different from that of the second optical channel; and
the digital signal processor performs computations to obtain information carried by each of the two polarization multiplexed channels in the incoming optical signal independent of the other channel.

8. The coherent optical detection system of claim 1 wherein the digital signal processor produces an output which is the result of a signal processing operation on a plurality of samples over time of the Jones vector of the incoming optical signal.

9. The coherent optical detection system of claim 8 wherein the signal processing operation performed by the digital signal processor at least partially reverses the effect of polarization mode dispersion imposed on the incoming optical signal.

10. The coherent optical detection system of claim 9 wherein the polarization mode dispersion imposed on the incoming optical signal changes over time, and the signal processing operation also changes over time so as to continue to at least partially reverse the effect of the polarization mode dispersion.

11. The coherent optical detection system of claim 8 wherein the signal processing operation performed by the digital signal processor improves the quality of the incoming optical signal, the digital signal processor applying an algorithm which utilizes parameters that are adjusted to give different signal processing functions, and the values of the parameters are chosen for improving the quality of the recovered signal.

12. The coherent optical detection system of claim 8 wherein the digital signal processor compensates for chromatic dispersion experienced by the incoming optical signal.

13. The coherent optical detection system of claim 8 wherein the digital signal processor compensates for the effect of self phase modulation experienced by the incoming optical signal.

14. The coherent optical detection system of claim 8 wherein the signal processing operation performed by the digital signal processor includes performing an optical filtering function on the Jones vector values.

15. A method of receiving an incoming optical signal in a coherent optical detection system, said method comprising the steps of:
emitting light from first and second local oscillators, each local oscillator not requiring a phase lock with the incoming optical signal;
generating four copies of the incoming signal and two copies of light from each local oscillator by an optical mixing hybrid;
combining, by the optical mixing hybrid into at least four outputs;
receiving optical signals from four of the at least four outputs by four photodetectors in communication with the optical mixing hybrid;
digitizing electrical signals, by four A/D converters, from the four photodetectors; and
performing computations, by a digital signal processor, on digital values from the at least two A/D converters to obtain information carried by the incoming optical signal.

16. The method of receiving an incoming optical signal of claim 15 wherein:
the first output of the optical mixing hybrid carries a copy of the incoming optical signal and a copy of light from the first local oscillator, and the third output of the optical mixing hybrid carries a copy of the incoming optical signal and a copy of light from the second local oscillator
the beat product observed upon photodetection of the first output of the optical mixing hybrid is substantially the same as the beat product that would be observed of the original incoming optical signal and light from the first local oscillator having a certain first state of polarization; and
the beat product observed upon photodetection of the third output of the optical mixing hybrid is substantially the same as the beat product that would be observed of the original incoming optical signal and light from the second local oscillator having a certain second state of polarization; and
the second state of polarization is close to orthogonal to the first state of polarization.

17. The method of receiving an optical signal of claim 15 wherein:
the four digitized signals from the four A/D converters arriving at the digital signal processor at the same time do not correspond to samples that are taken at the same time with respect to the envelope of the electric field of the incoming optical signal; and
the step of performing a computation on digital values from the A/D converters by the digital signal processor includes compensating for the different path delays experienced by the four signal paths from the incoming optical signal's input to the optical mixing hybrid to the digital signal processor.

18. The method of receiving an incoming optical signal of claim 15 wherein the step of performing computations by the digital signal processor includes obtaining a Jones vector representation or equivalent representation that includes the amplitude, phase and polarization of the incoming optical signal.

19. The method of receiving an incoming optical signal of claim 18 wherein:

the incoming optical signal includes two optical channels combined such that the states of polarization of the two optical channels are close to orthogonal to one another; and the step of performing computations by the digital signal processor separates the two optical channels from one another, and computes the information content of each optical channel without crosstalk from the other optical channel.

20. The method of receiving an incoming optical signal of claim 18 wherein:

the incoming optical signal includes two optical channels combined such that the states of polarization of the two optical channels are different from one another; and the step of performing computations by the digital signal processor separates the two optical channels from one another, and computes the information content of each optical channel without crosstalk from the other optical channel.

* * * * *